United States Patent
Torii et al.

(10) Patent No.: US 7,639,374 B2
(45) Date of Patent: Dec. 29, 2009

(54) OPTICAL DISPLACEMENT SENSOR

(75) Inventors: Tomonari Torii, Osaka (JP); Tomoki Hanada, Osaka (JP)

(73) Assignee: Keyence Corporation, Osaka (JP)

( * ) Notice: Subject to any disclaimer, the term of this patent is extended or adjusted under 35 U.S.C. 154(b) by 74 days.

(21) Appl. No.: 11/950,480

(22) Filed: Dec. 5, 2007

(65) Prior Publication Data

US 2008/0140324 A1 Jun. 12, 2008

(30) Foreign Application Priority Data

Dec. 7, 2006 (JP) ............................. 2006-330278

(51) Int. Cl.
G01B 11/14 (2006.01)
(52) U.S. Cl. ..................................... 356/614; 356/622
(58) Field of Classification Search ................ 356/614, 356/27, 622–623; 250/559.4, 221, 222.1, 250/239, 214 R; 235/462.2, 462.24–462.27; 340/691.6
See application file for complete search history.

(56) References Cited

U.S. PATENT DOCUMENTS

| 4,171,160 A | * | 10/1979 | Ernst | 356/623 |
| 6,555,806 B2 | * | 4/2003 | Okamoto | 250/221 |
| 6,710,326 B2 | | 3/2004 | Okamoto | |
| 6,838,656 B2 | | 1/2005 | Okamoto | |

FOREIGN PATENT DOCUMENTS

| JP | 2006-030094 | 2/2006 |
| JP | 2006-030095 | 2/2006 |
| JP | 2006-038571 | 2/2006 |
| JP | 2006-080896 | 3/2006 |

* cited by examiner

*Primary Examiner*—Gregory J Toatley, Jr.
*Assistant Examiner*—Tri T Ton
(74) *Attorney, Agent, or Firm*—Kilyk & Bowersox, P.L.L.C.

(57) ABSTRACT

An optical displacement sensor is described that is capable of correctly detecting a target object, even if the position of the target object is changed in an amount greater than the thickness of the target object.

8 Claims, 19 Drawing Sheets

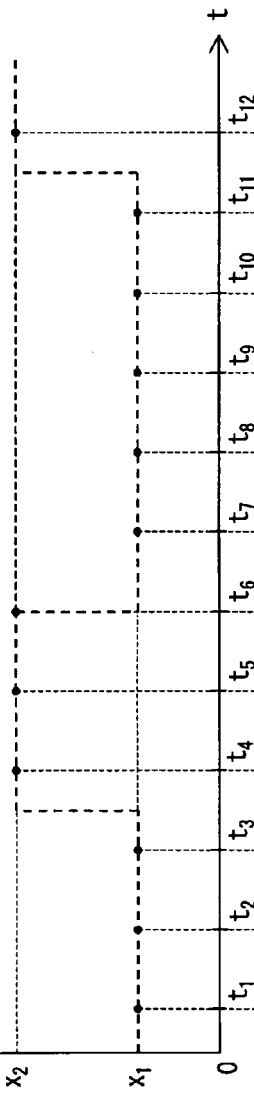
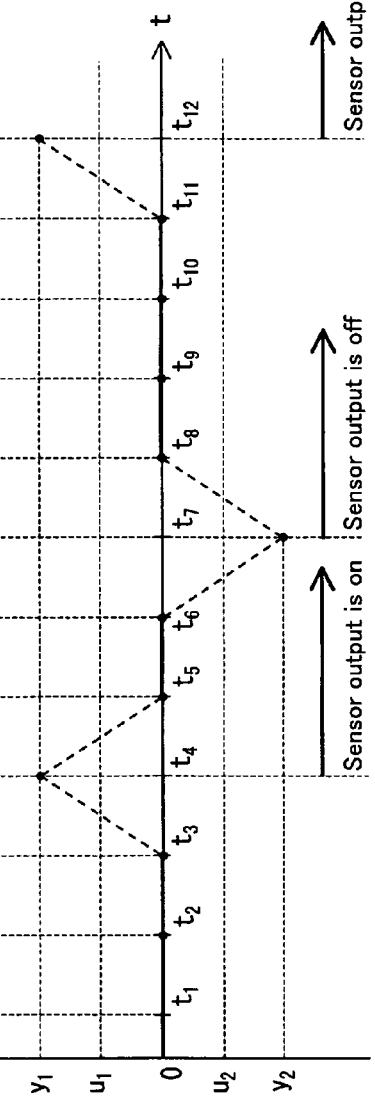
Fig. 7A
Fig. 7B

# OPTICAL DISPLACEMENT SENSOR

CROSS-REFERENCE TO RELATED APPLICATION

The present application claims priority from Japanese Patent Application No. 2006-330278, filed on Dec. 7, 2006, the entire contents of which are hereby incorporated by reference.

BACKGROUND OF THE INVENTION

1. Field of the Invention

The present invention relates to an optical displacement sensor and more particularly relates to improvement of an optical displacement sensor which detects target objects on the basis of the output of a light reception device which receives light reflected by the target objects when projected light is directed to the target objects.

2. Description of the Related Art

As sensors for detecting the presence or absence of a target object by directing light to the target object, there have been known photoelectric sensors and optical displacement sensors. Such photoelectric sensors are sensors which determine the presence or absence of a target object, on the basis of whether or not a light reception device receives projected light emitted from a light projection device (for example, Japanese Published Patent No. 2006-80896). Optical displacement sensors are sensors which calculate the amount of displacement of a target object, on the basis of light reflected by the target object when projected light is directed to the target object, and determine the presence or absence of the target object, on the basis of the calculated an amount of displacement.

Such optical displacement sensors are capable of determining the presence or absence of objects without being influenced by the colors and the materials of the objects, in comparison with photoelectric sensors which perform the determination simply on the basis of the amount of received light, since the amount of received light detected by the light reception device is varied depending on the colors and the materials of the target objects. Further, a displacement sensor including a light reception device constituted by a plurality of light reception elements arranged in a linear shape for receiving light reflected by a target object determines a one-dimensional position of the received-light spot on the light reception device, on the basis of the amount of light received by the respective light reception elements. The amount of displacement of a target object is calculated on the basis of the determination of position of the received-light spot obtained in such a manner.

FIG. 16 is a view illustrating the structure of a conventional optical displacement sensor 100, schematically illustrating a state where projected light emitted from a light projection device 101 is received by a light reception unit 104. The optical displacement sensor 100 is constituted by the light projection device 101, and the light reception unit 104 constituted by a light reception lens 102 and a light reception device 103. The light projection device 101 is a light source device for directing projected light to a work (target object) 120 placed on a work bench 110. The light reception lens 102 is a condenser lens for converging the light reflected by the work 120 from the projected light on the light reception device 103. The light reception device 103 is a light reception device for receiving the reflected light from the work 120 and outputs signals corresponding to the position of the received-light spot. The light emitted from the light projection device 101 and directed to the work 120 is reflected by the work 120 and is converged at a position on the light reception device 103 which is varied depending on the height of the irradiation point on the work 120, namely the position of the irradiation point in the direction of the optical axis of the projected light. The displacement sensor 100 determines the one-dimensional position of the received-light spot on the light reception device 103 on the basis of the output of the light reception device 103 and calculates the amount of displacement of the work 120 on the basis of the result of the determination.

FIG. 17 is a view illustrating the optical displacement sensor 100 placed in a manufacturing line. The displacement sensor 100 is used for detecting the presence or absence of works 120 being transferred on the work bench 110 in the direction of the line. In this case, when a work 120 exists at a position beneath the displacement sensor 100 to which the projected light is directed, the position of the received-light spot is different from the position of the received-light spot of when a work 120 does not exist. The displacement sensor 100 detects the presence or absence of the work 120, utilizing the fact that the position of the received-light spot is varied depending on whether or not the work 120 exists, and the amount of displacement of the work 120 is changed.

FIG. 18 is a timing chart illustrating operations of the optical displacement sensor 100 for detection of works, illustrating detected values of the amount of displacements and sensor outputs indicative of the presence or absence of works 120. The detected value of the amount of displacement is the position of the irradiation point in the direction of the optical axis of the projected light and is calculated on the basis of the position of the received-light spot. The detected value x200 of the amount of displacement acquired when a work 120 exists is greater than the detected value x100 of when the work 120 does not exist. The threshold value u100 is a threshold value for use in determining the presence or absence of a work 120 and is preliminarily determined according to the thicknesses of the works in the direction of the optical axis of the projected light (x100<u100<x200). If the detected value of the amount of displacement is decreased to below the threshold value u100, the sensor output is turned off, and the voltage level thereof is switched from a high level to a low level. Further, if the detected value of the amount of displacement is increased to above the threshold value u100, the sensor output is turned on, and the voltage level thereof is switched from the low level to the high level. The displacement sensor 100 determines the presence or absence of a work 120, by making a comparison between the detected value of the amount of displacement and the threshold value u100, as described above.

SUMMARY OF THE INVENTION

In general, when works are transferred by being placed on a belt conveyer, if swaying, swelling or fluttering of the belt conveyer occurs, the positions of the works are changed in the direction of the optical axis of the projected light. A conventional optical displacement sensor as described above determines the presence or absence of a work by making a comparison between detected height values and a threshold value determined according to the thicknesses of the works in the direction of the optical axis of projected light, which has induced the problem that, if the amount of the change of the position due to swaying, swelling or fluttering is greater than the thickness of the works, this makes it impossible to determine correctly the presence or absence of works.

FIG. 19 is a view illustrating an operation of the optical displacement sensor 100 for detection of works, illustrating a case where the positions of the works are changed in the direction of the optical axis of the projected light. A plurality of works 120 are placed on a belt conveyer as a work bench 110, and these works 120 are successively transferred to beneath the displacement sensor 100 through the belt conveyer. Large swelling is occurring in this belt conveyer, and a work 120 which exists at a position below a peak A100 of the swelling may be lower than the peak A100 of the swelling. In such a case, there is induced the problem that the determination of the presence or absence of the work 120 can not be correctly performed.

In view of the above-mentioned circumstances, an object of the present invention is to provide an optical displacement sensor capable of improving the detection accuracy in detecting the presence or absence of works. More particularly, the present invention aims at providing an optical displacement sensor capable of correctly detecting target objects, even if the positions of the target objects are changed more largely than the thickness of the target objects in the direction of the optical axis of the projected light. Further, the present invention also aims at providing an optical displacement sensor capable of suppressing the variation of detected values due to the swaying, swelling and fluttering of a work bench on which target objects are placed.

An optical displacement sensor according to a first embodiment includes a light projection device for directing projected light to a target object; a light reception device for receiving light reflected by said target object from the projected light; an amount-of-displacement calculation unit for determining a one-dimensional position of a received-light spot on the light reception device, on the basis of the output of said light reception device, and calculating a amount of displacement of said target object, on the basis of the one-dimensional position of the received-light spot determined; a difference-value creation unit for sampling the amount of displacement calculated by said amount-of-displacement calculation unit by a constant time interval, and determining a value of a difference between a current value representing the amount of displacement sampled at a current timing and a previous value representing the amount of displacement sampled at a previous timing prior to the current timing as a difference value; a difference-value comparison unit for making a comparison of the difference value determined by said difference-value creation unit with two threshold values including a positive threshold value and a negative threshold value; and an object detection unit for determining the presence or absence of said target object on the basis of the result of the comparison made by said difference-value comparison unit, and outputting a detection signal indicative of the result of the determination of the presence or absence of said target object; wherein said object detection unit turns on the detection signal on the basis of the result of the comparison of the difference value with one of the two threshold values, and turns off the detection signal on the basis of the result of the comparison of the difference value with the other of the two threshold values.

With the optical displacement sensor, an amount of displacement calculated on the basis of a one-dimensional position of a received-light spot on the light reception device is sampled at constant time intervals, and a difference value in amount of displacement is determined from a representative value of an amount of displacements sampled until the previous sampling and the amount of displacement obtained by the current sampling. Further, the determined difference value is compared with the positive threshold value and the negative threshold value, and detection signals are outputted on the basis of the result of the comparison. At this time, the detection signals indicative of the result of the determination of the presence or absence of a target object are turned on, on the basis of the result of the comparison between the difference value and one of the positive threshold value and the negative threshold value and turned off, on the basis of the result of the comparison between the difference value and other one of the positive threshold value and the negative threshold value. In this case, the representative value of the amount of displacements is the amount of displacement obtained at the previous sampling, a simple average value over the previously obtained amount of displacement, or a moving average value over the previously obtained amount of displacement.

In general, even when the position of the target object is changed in the direction of the optical axis of the projected light, if the period of the change of the position is greater than the time intervals of sampling of the amount of displacement, it is expected that the difference value between amount of displacements is largely changed due to the existence of the target object. The optical displacement sensor according to the embodiment employs the aforementioned structure for determining the presence or absence of a target object on the basis of difference values between amounts of displacements, thereby correctly detecting the target object, even if the position of the target object is changed more largely than the thickness of the target object in the direction of the optical axis of the projected light.

An optical displacement sensor according to a second embodiment is structured, in addition to the aforementioned structure, such that the aforementioned object detection unit turns on the detection signals if the difference value exceeds the positive threshold value in the positive direction and turns off the detection signals if the difference value exceeds the negative threshold value in the negative direction.

An optical displacement sensor according to a third embodiment includes, in addition to the aforementioned structure, an amount-of-displacement storage unit for storing the amount of displacement calculated by the aforementioned amount-of-displacement calculation unit, an amount-of-displacement display unit for displaying the amount of displacement stored in the amount-of-displacement storage unit, and an amount-of-displacement updating unit for, if a new amount of displacement is obtained, selecting one of the amount of displacement read from the amount-of-displacement storage unit and the amount of displacement calculated by the amount-of-displacement calculation unit, on the basis of the result of the comparison made by the difference-value comparison unit, and rewriting the content of the amount-of-displacement storage unit. With this structure, the content of the amount-of-displacement storage unit is rewritten on the basis of the results of the comparisons between the difference value and the positive threshold value and the negative threshold value, and the detected value of the amount of displacement is updated, which can suppress the variation of detected values due to swaying, swelling and fluttering of the work bench on which the target object is placed.

An optical displacement sensor according to a fourth embodiment includes, in addition to the aforementioned structure, a number-of-spots determination unit for determining the number of received-light spots on the light reception device, on the basis of the output of the light reception device, wherein the amount-of-displacement updating unit rewrites the content of the amount-of-displacement storage unit if the number of received-light spots is one, but does not rewrite it in other cases. With this structure, the detected value of the amount of displacement is updated only when the number of received-light spots on the light reception device is one, which can suppress the variation of detected values when the reflected light from the target object contains light caused by multiple reflections.

An optical displacement sensor according to a fifth embodiment includes, in addition to the aforementioned structure, a spot-width determination unit for determining the width of the received-light spot, on the basis of the output of the light reception device, wherein the amount-of-displacement updating unit rewrites the content of the amount-of-displacement storage unit, on the basis of the result of the determination by the spot-width determination unit, if the number of received-light spots is one.

An optical displacement sensor according to a sixth embodiment includes, in addition to the aforementioned structure, a number-of-spots determination unit for determining the number of received-light spots on the light reception device, on the basis of the output of the light reception device, wherein the amount-of-displacement calculation unit performs processing for determining the one-dimensional position of the received-light spot and calculating the amount of displacement if the number of received-light spots is one, but does not perform the processing for calculating the amount of displacement in other cases, and the difference-value creation unit does not perform the processing for determining the difference value until the next sampling if a new amount of displacement is not obtained by sampling, but, if a new amount of displacement is obtained, the difference-value creation unit determines the value of difference between this new amount of displacement and the amount of displacement obtained by the previous sampling. In general, if the projected light is irregularly reflected by an end portion of the target object, it is expected that a distortion is induced in the distribution of the amount of light on the light reception device. In such a case, the position of the received-light spot can not be determined correctly or the position of the received-light spot is wrongly determined even if it is determined, in many cases. The optical displacement sensor according to the embodiment having the aforementioned structure performs the processing for calculating the amount of displacement on the basis of the result of determination of the number of received-light spots and determines a difference value and determines the presence or absence of a target object only when a new amount of displacement is obtained. Accordingly, the determination of the presence or absence based on the difference value is not performed in the aforementioned case and is performed only when no distortion occurs in the distribution of the amount of light, which can improve the accuracy of detection of a target object.

With the optical displacement sensor according to the present invention, the determination of the presence or absence of a target object is performed on the basis of difference values between amount of displacements, which enables correctly detecting a target object and improving the detection accuracy in detecting the presence or absence of a target object, even if the position of the target object is changed more largely than the thickness of the target object. Further, the content of the amount-of-displacement storage unit is rewritten on the basis of the results of the comparisons between the difference value and the positive threshold value and the negative threshold value, and the detected value of the amount of displacement is updated, which can suppress the variation of detected values due to the swaying, swelling and fluttering of the work bench on which the target object is placed.

BRIEF DESCRIPTION OF THE DRAWINGS

FIGS. 7A and B is a view illustrating exemplary operations of the optical displacement measurement device 1 of FIG. 1 for detection of works, illustrating the amount of displacements and difference values obtained at respective samplings;

Figure 16:
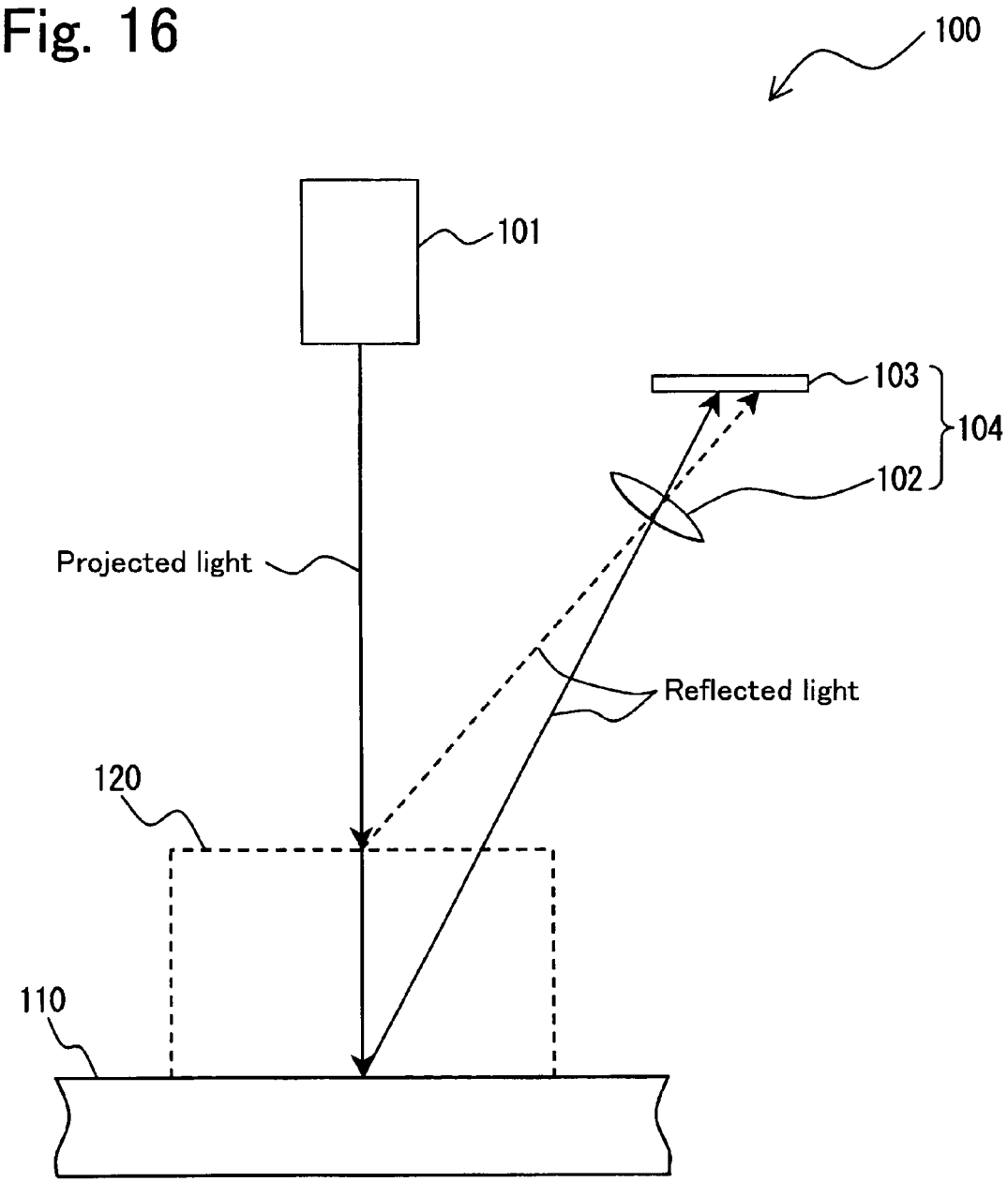
Figure 17:
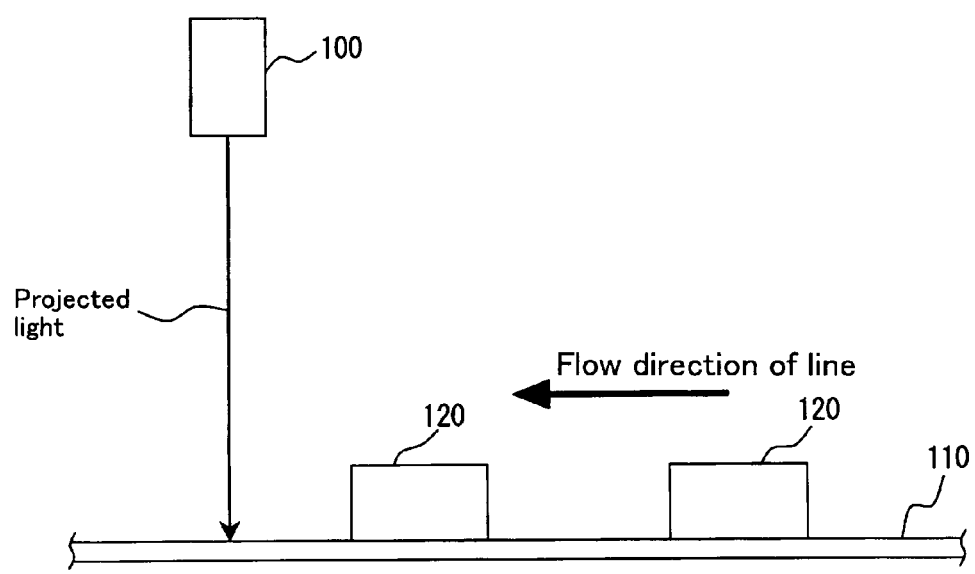
Figure 18:
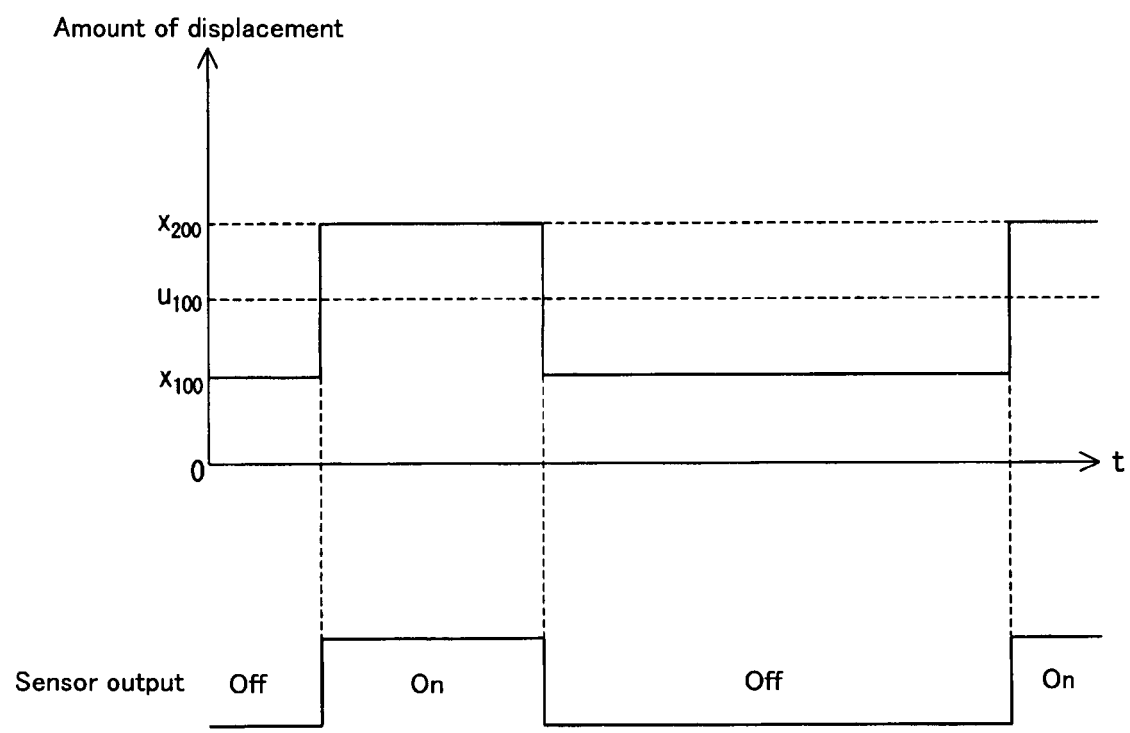
Figure 19:
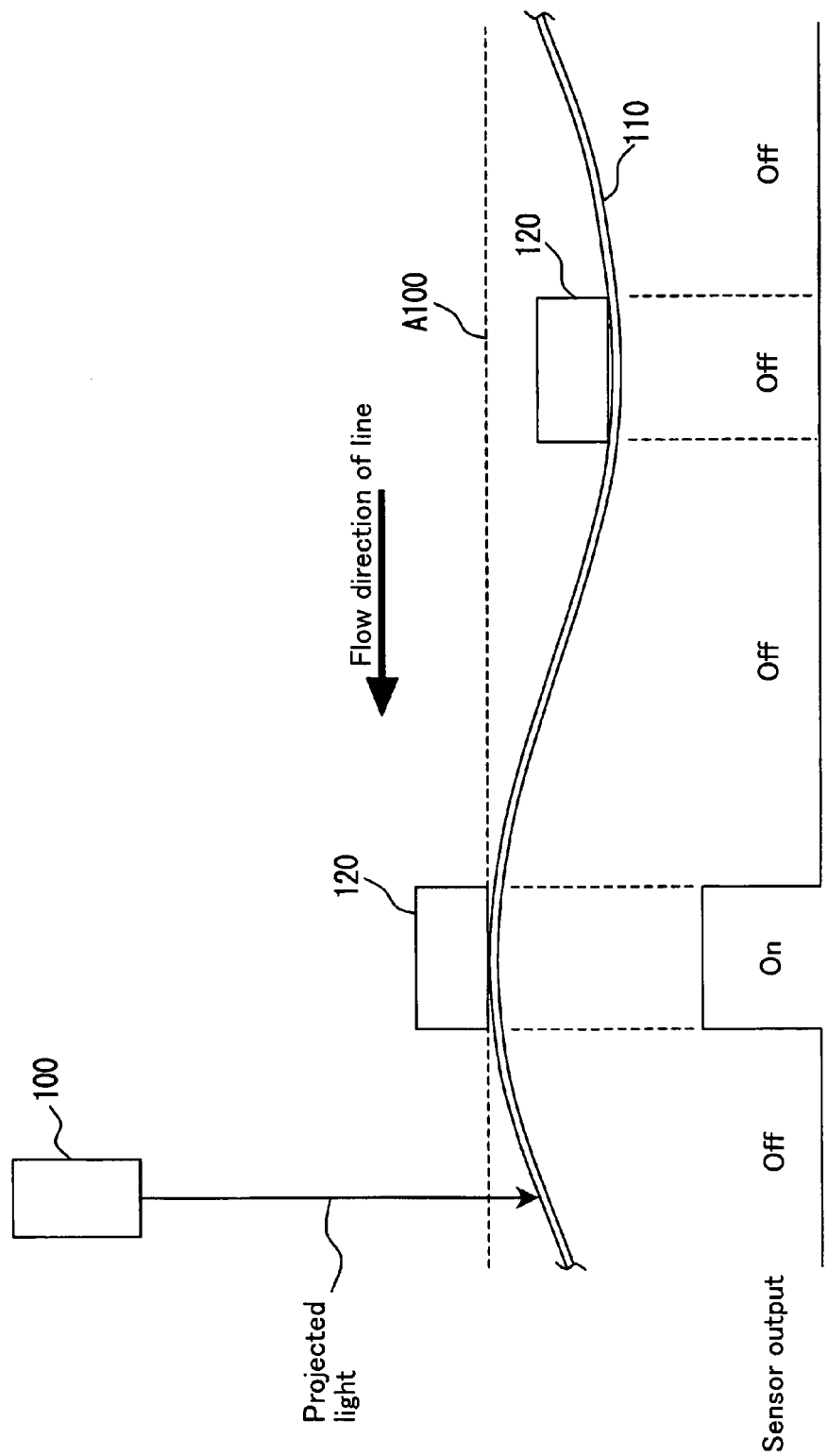

FIG. 16 is a view schematically illustrating the structure of a conventional optical displacement sensor 100, schematically illustrating a state where projected light is received by a light reception unit 104;

FIG. 17 is a view illustrating the optical displacement sensor 100 placed in a manufacturing line;

FIG. 18 is a timing chart illustrating exemplary operations of the optical displacement sensor 100 for detection of works, illustrating detected values of amounts of displacements and sensor outputs; and FIG. 19 is a view illustrating an exemplary operation of the optical displacement sensor 100 for detection of works, illustrating a case where the positions of the works are changed in the direction of the optical axis of the projected light.

DETAILED DESCRIPTION OF THE PREFERRED EMBODIMENTS

Figure 1:
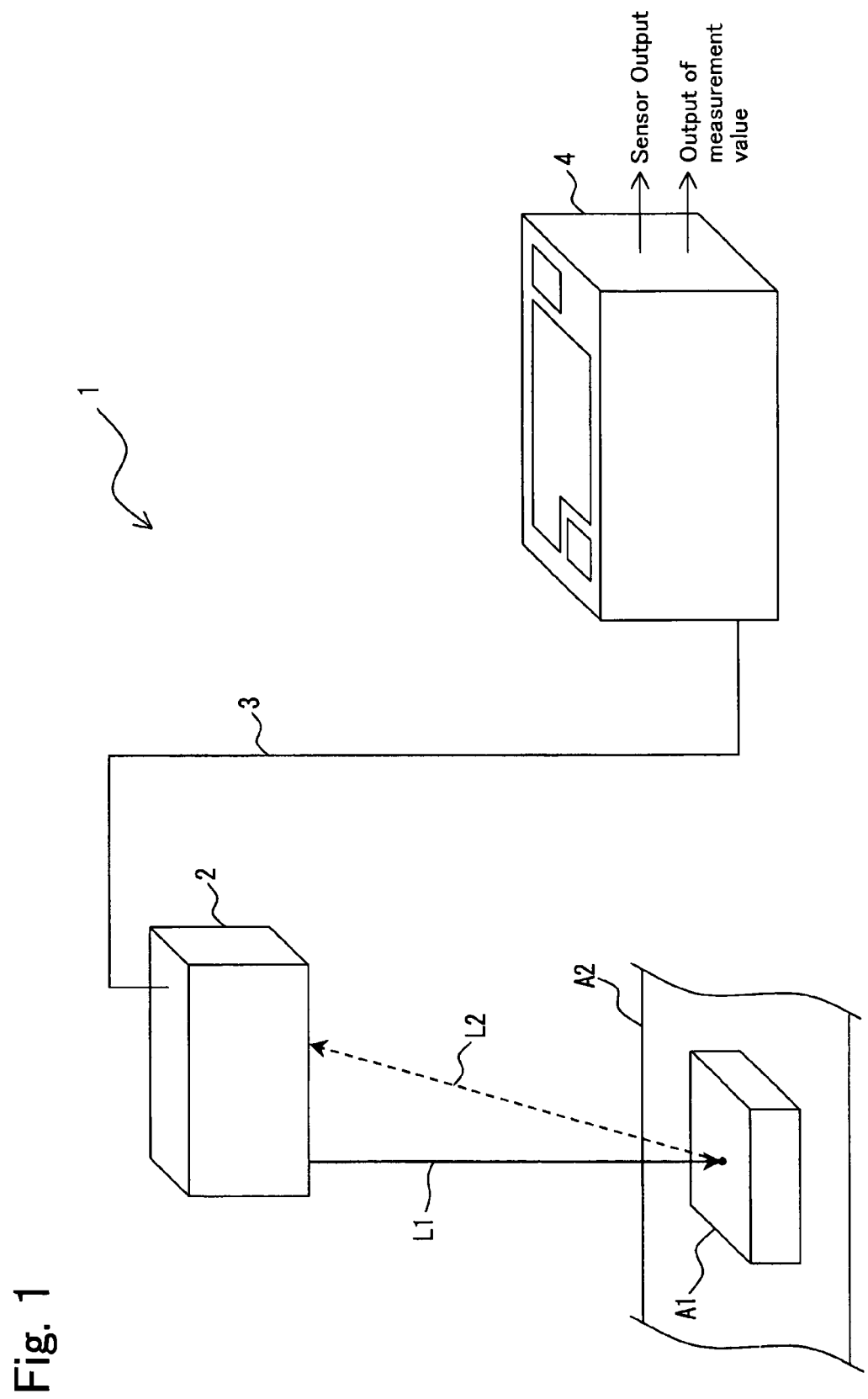
FIG. 1 is a perspective view illustrating an exemplary schematic structure of an optical displacement sensor according to an embodiment of the prevent invention, illustrating an optical displacement measurement device 1 for directing projected light L1 to a work A1 for detecting it.

FIG. 1 is a perspective view illustrating an exemplary schematic structure of an optical displacement sensor according to an embodiment of the present invention, illustrating, as an exemplary optical displacement sensor, an optical displacement measurement device 1 for detecting the presence or absence of a work A1, on the basis of reflected light L2 resulting from the irradiation of projected light L1. The optical displacement measurement device 1 is a detection device constituted by a head unit 2, a transmission cable 3 and a main-body unit 4 and detects the work A1 placed on a work bench A2.

The head unit 2 is a rectangular-parallelepiped-shaped unit which includes a light projection device for directing projected light L1 to the work A1 and a light reception device for receiving the light L2 reflected by the work A1 from the projected light L1 and adjusts the output of the light projection device on the basis of the output of the light reception device. The head unit 2 is placed on, for example, a manufacturing line for the work A1 and emits the projected light L1 in just the downward direction.

The transmission cable 3 is a cable for supplying electric power to the head unit 2, for transmitting the output of the light reception device to the main-body unit 4 and for transmitting control signals from the main-body unit 4 to the head unit 2.

The main-body unit 4 is a unit which detects the received-light spot on the light reception device and, on the basis of the result of the detection, determines the presence or absence of the work A1 and calculates the amount of displacement thereof. On one surface of the casing of the main-body unit 4, there are placed various types of operation keys and a display portion for displaying the presence or absence of the work A1 and the result of measurements.

The detection of the received-light spot based on the output of the light reception device is performed by using, as triggers, timing signals inputted from an external apparatus such as a PLC (Programmable Logic Controller) which is not illustrated.

Figure 2:
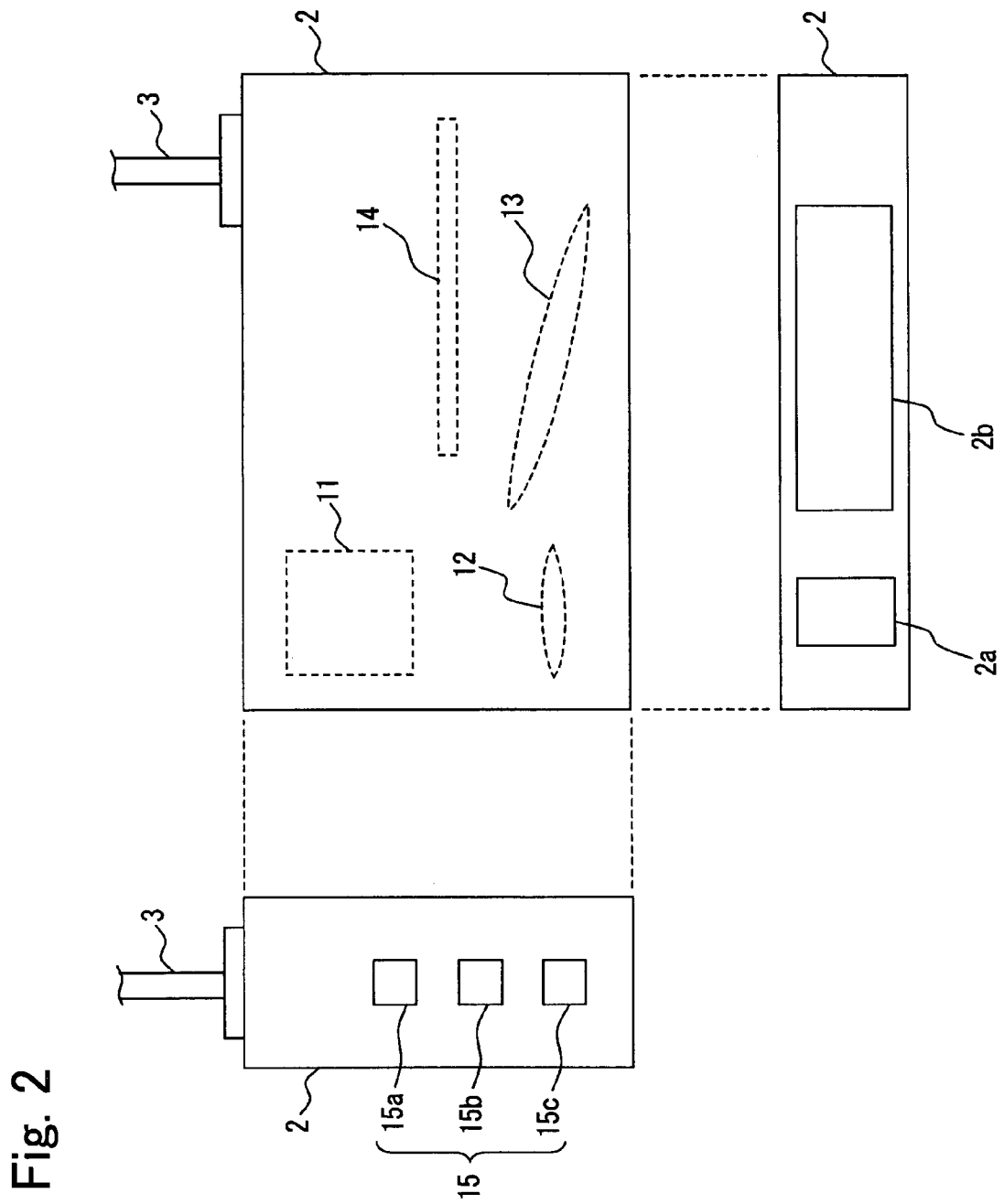
FIG. 2 is an external view of an exemplary structure of a head unit 2 in the optical displacement measurement device 1 of FIG. 1.

FIG. 2 is an external view illustrating an exemplary structure of the head unit 2 in the optical displacement measurement device 1 of FIG. 1. This head unit 2 includes a light projection device 11, a light projection lens 12, a light reception lens 13 and a light reception device 14 within a casing, and a head indicator 15, constituted by LED indicating lights 15a to 15c, which is placed on a side surface of the casing.

The light projection device 11 is a light-source device for creating the projected light L1 and is constituted by a light emitting device such as an LD (laser diode) and the like. The light projection lens 12 is a condenser lens for converging the projected light L1 emitted from the light projection device 11 and is placed at a position closer to the work A1 than the light projection device 11. The projected light L1 passed through the light projection lens 12 is directed to the work A1 through a rectangular-shaped light projection window 2a provided in the front surface of the casing.

The light reception lens 13 is a condenser lens for converging, onto the light reception device 14, the light L2 reflected by the work A1 when the projected light L1 is directed to the work A1, wherein the reflected light L2 enters the light reception lens 13 through a light reception window 2b provided in the front surface of the casing. The light reception device 14 is an image pickup device constituted by a plurality of light reception elements placed in a linear shape for receiving the reflected light L2 from the work A1, and the respective light reception elements output signals corresponding to the amount of the received light. More specifically, a line CCD (Charge Coupled Device) constituted by a plurality of PDs (photo diodes) placed along a straight line is used as the light reception device 14.

In FIG. 2, the light emitted from the light projection device 11 and directed to the work A1 shown in FIG. 1 is reflected by the work A1 and is converged at a position on the light reception device 14 which is varied depending on the height of the irradiation point on the work A1, namely the distance to the irradiation point from the work bench A2. Also, it is possible to employ, as the light reception device 14, an image pickup device constituted by a plurality of light reception elements placed in a plane shape, provided that the change of the position of the received-light spot on the light reception device 14 caused by the change of the height of the irradiation height can be determined therewith.

In general, when the projected light L1 is directed in just the downward direction, if the height of the irradiation point is changed, this will change the incident angle of the reflected light L2 with respect to the light reception lens 13. In such a case, by placing the light reception lens 13 and the light reception device 14 such that the plane including the main surface of the light reception lens 13 and the straight line indicative of the direction of arrangement of the light reception elements in the light reception device 14 are intersected with each other on the optical axis of the projected light L1, it is possible to cause the reflected light L2 to form an image on the light reception device 14, due to the Scheimpflug principle.

The LED indicating light 15a is an indicating light indicative of the state of the output of the projected light L1 and is constituted by an LED (Light Emitting Diode). The LED indicating light 15a is lighted in a green color during irradiation of the projected light L1, but is turned off during non-irradiation, for example. The LED indicating light 15b is an indicating light indicative of the state of the output of a sensor in the main-body unit 4 and is turned off when the sensor output is at an ON state, but is lighted in a red color when the sensor output is at an OFF state, for example.

The LED indicating light 15c is an indicating light indicative of the presence or absence of multiple reflections on the work A1 and is lighted in a green color when the reflected light L2 from the work A1 contains light caused by multiple reflections, but is turned off when it does not contain light caused by multi reflection, for example.

Figure 3:
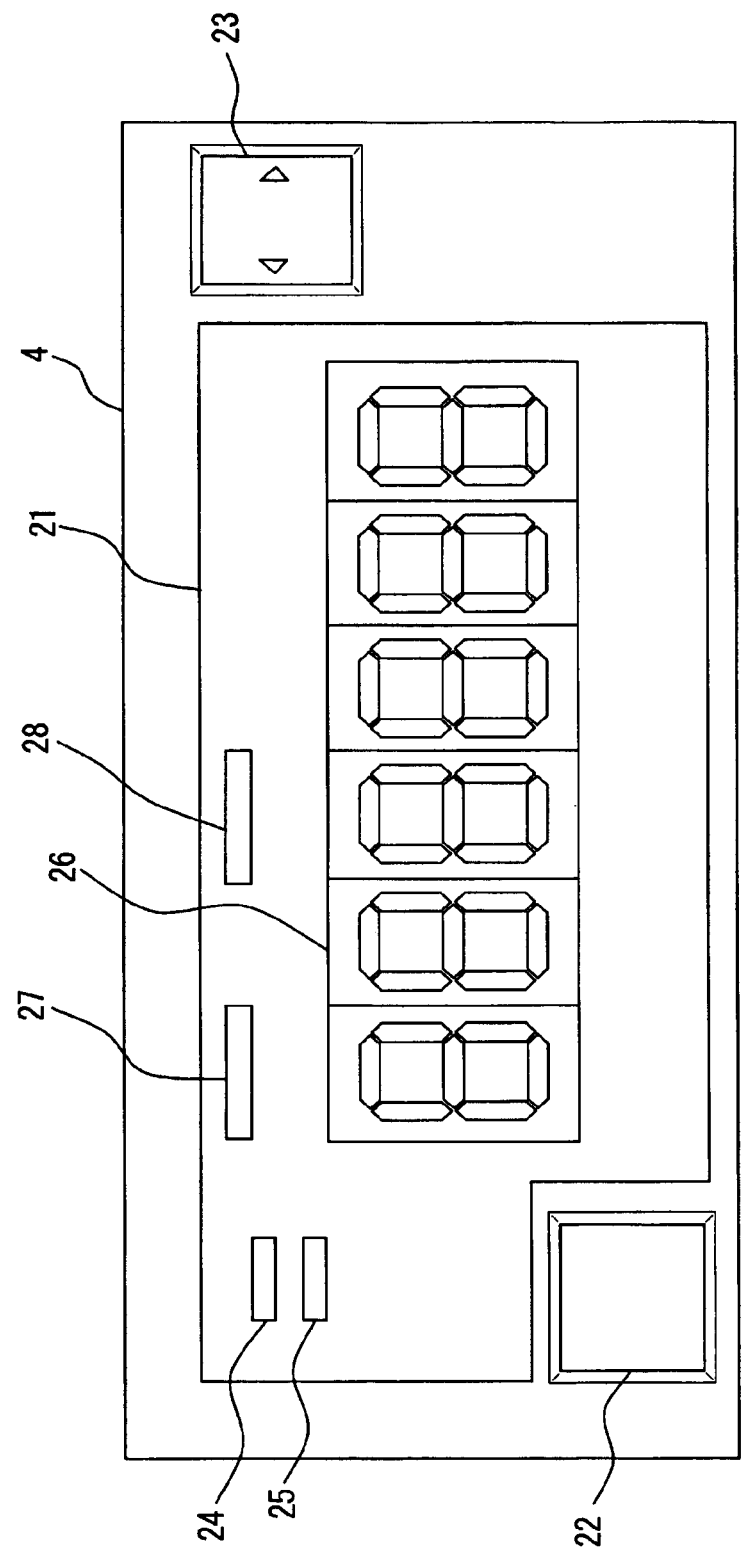
FIG. 3 is an external view of an exemplary structure of a main-body unit 4 in the optical displacement measurement device 1 of FIG. 1, illustrating the state of a casing side surface.

FIG. 3 is an external view illustrating an exemplary structure of the main-body unit 4 in the optical displacement measurement device 1 of FIG. 1, illustrating the state of a side surface of the casing which is provided with a display portion 21, a set key 22 and a direction key 23. The display portion 21 is constituted by various types of LED indicating lights 24, 25, 27 and 28 and a 7-segment LED display portion 26. The LED indicating light 24 is an indicating light indicative of the state of the output of the projected light L1 and is constituted by an LED (Light Emitting Diode). The LED indicating light 24 is lighted in a green color during irradiation of the projected light L1, but is turned off during non-irradiation, for example.

The LED indicating light 25 is an indicating light indicative of the state of the output of the sensor in the main-body unit 4 and is turned off when the sensor output is at an ON state, but is lighted in a red color when the sensor output is at an OFF state, for example. The LED indicating light 27 is an indicating light indicative of the operation mode.

The LED indicating light 28 is an indicating light indicative of the presence or absence of multiple reflections on the work A1 and is lighted in a green color when the reflected light L2 from the work A1 contains light caused by multiple reflections, but is turned off when it does not contain multiple reflections, for example.

The 7-segment LED display portion 26 is a display device for displaying characters indicative of the detection result of the amount of displacement and is constituted by six 7-segment LEDs placed at the center of the display portion 21. The respective 7-segmemt LEDs are arranged in the longitudinal direction of the side surface of the casing.

The set key 22 is an operation key for specifying a reference point for use in determining the presence or absence of the work A1 and in outputting measurement values and is placed at the left end portion of the casing side surface. In this case, two types of operation inputs, which are normal push and long push, can be performed with the set key 22, and inputs are performed according to the operation method. The normal push is an operation method for ending an ON state before the elapse of a predetermined time period. On the other hand, the long push is an operation method for maintaining an ON state beyond the predetermined time period. The direction key 23 is an operation key for changing the operation mode and is placed at the right end portion of the casing side surface.

Figure 4:
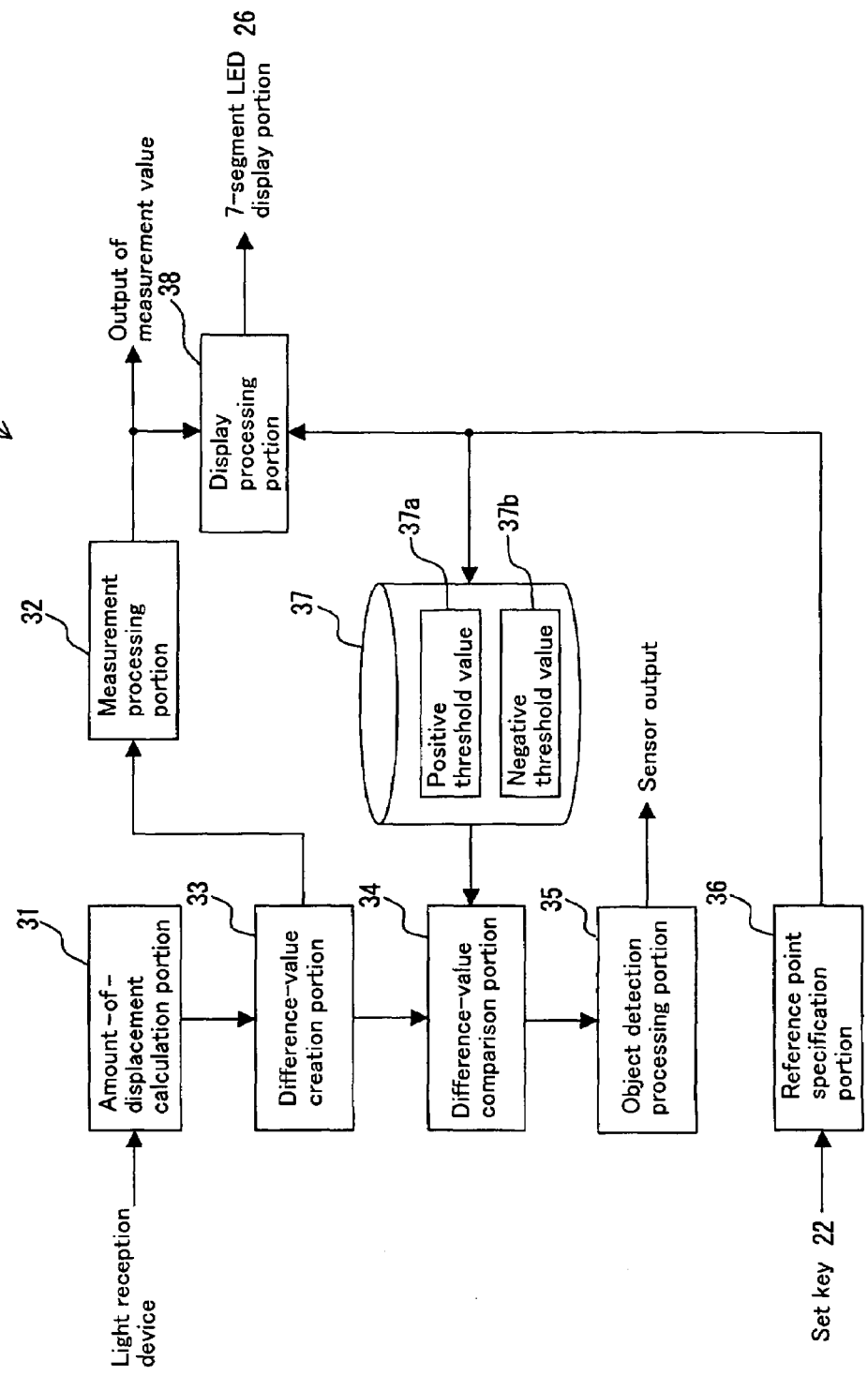
FIG. 4 is a block diagram illustrating an exemplary structure of main parts of the optical displacement measurement device 1 of FIG. 1, illustrating an exemplary functional structure of the main-body unit 4.

FIG. 4 is a block diagram illustrating an exemplary structure of main parts of the optical displacement measurement device 1 of FIG. 1, illustrating an exemplary functional structure in the main-body unit 4. The main-body unit 4 is constituted by an amount-of-displacement calculation portion 31, a measurement processing portion 32, a difference-value creation portion 33, a difference-value comparison portion 34, an object detection processing portion 35, a reference-point specification portion 36, a threshold-value storage portion 37 and a display processing portion 38.

The amount-of-displacement calculation portion 31 performs processing for determining a one-dimensional position of the received-light spot on the light reception device 14 on the basis of the outputs of the respective light reception elements in the light reception device 14 and calculating the amount of displacement of the work A1 on the basis of the result of the determination. More specifically, the amount of received light detected by the respective light reception elements are determined, and a received-light spot is extracted from the one-dimensional distribution of the amount of received light in the direction of arrangement of the light reception elements. For example, a one-dimensional area in which the amount of received light exceeds a predetermined threshold value T1 is extracted as a received-light spot. Then, within the one-dimensional area extracted as a received-light spot from the one-dimensional distribution of the amount of received light, the position at which the amount of received light is maximum, namely the peak position, is determined to be the position of the received-light spot and, on the basis of the peak position, the amount of displacement is calculated. As for the amount of displacement, the position of the irradiation point on the work A1 in the direction of optical axis of the projected light L1 is calculated.

In this case, if two or more received-light spots are extracted, the processing for calculating the amount of displacement is performed, with respect to the received-light spot at which the amount of received light is maximum.

The difference-value creation portion 33 performs processing for sampling amount of displacements calculated by the amount-of-displacement calculation portion 31 at constant time intervals and determining the value of the difference between two amounts of displacement resulted from the sampling. More specifically, the value of the difference between a representative value of amounts of displacements obtained until the previous sampling and the amount of displacement obtained through the current sampling is determined.

As the representative value of amounts of displacements, it is possible to employ the amount of displacement obtained at the previous sampling, a simple average value over the previously obtained amounts of displacements, or a moving average value over the previously obtained amounts of displacements. The simple average value of amounts of displacements refers to an average value over a plurality of amounts of displacements obtained until the previous sampling from a predetermined sampling time point. Further, the moving average value refers to an average value over a predetermined sampling number of amounts of displacements obtained until the previous sampling. In this case, the value of the difference between two amounts of displacements which have been continuously obtained is calculated. That is, in cases where amounts $x1$ and $x2$ of displacements are continuously obtained in the mentioned order, the difference therebetween $(x2-x1)$ is determined and output as a difference value.

The measurement processing portion 32 performs processing for outputting measurement values, on the basis of the result of the calculation of the difference value by the difference-value creation portion 33.

The difference-value comparison portion 34 performs processing for comparing the difference value determined by the difference-value creation portion 33 with a positive threshold value 37a and a negative threshold value 37b and outputting the result of the comparison. The positive threshold value 37a and the negative threshold value 37b are threshold values determined preliminarily on the basis of the thickness of the work A1. In this case, the positive threshold value 37a is a positive value, while the negative threshold value 37b is a negative value.

The object detection processing portion 35 performs processing for determining the presence or absence of the work A1 on the basis of the result of comparison by the difference-value comparison portion 34 and outputting detection signals indicative of the result of the determination. More specifically, the object detection processing portion 35 performs processing for turning on detection signals on the basis of one of the result of comparison between the difference value and the positive threshold value 37a and the result of comparison between the difference value and the negative threshold value 37b and turning off detection signals on the basis of the other one of the results of comparisons.

Detection signals indicative of the result of the determination of the presence or absence are outputted as state signals having, for example, two different voltage levels, and the voltage level of the detection signals is switched therebetween on the basis of the determination of the presence or absence. More specifically, assuming that the direction of the thickness of the work A1 along the optical axis of the projected light L1, namely the direction toward the head unit 2, is a positive direction, if the difference value exceeds the positive threshold value 37a in the positive direction, it is determined that there exists the work A1 and, therefore, detection signals are turned on. On the other hand, if the difference value exceeds the negative threshold value 37b in the negative direction, it is determined that the work A1 no longer exists beneath the head unit 2 and detection signals are turned off.

The reference-point specification portion 36 performs processing for specifying a reference point for use in detecting the presence or absence of the work A1 and outputting of measurement values, on the basis of the operations on the set key 22. In this case, the positive threshold value 37a and the negative threshold value 37b for use in determining the presence or absence of the work A1 are automatically determined, on the basis of two reference points specified by a user.

More specifically, the position of a received-light spot obtained at the timing of the normal push of the set key 22 is set as a reference point. Further, the positive threshold value 37a and the negative threshold value 37b are determined by determining the value of the difference (x2–x1) between the amount x1 of displacement corresponding to a first reference point obtained through a first operation and the amount x2 of displacement corresponding to a second reference point obtained through a second operation performed at different timing from the first operation to be the thickness of the work A1.

Usually, the first operation on the set key 22 is performed at a state where the work A1 does not exist on the work bench A2 and the second operation on the set key 22 is performed at a state where the work A1 exists on the work bench A2. In this case, the threshold values 37a and 37b are determined such that their absolute values agree with each other. The threshold values 37a and 37b determined as described above are stored in the threshold-value storage portion 37.

Further, in this case, in order to display 0 as the difference value used for detections, regardless of whether the detection is on or off, the following displaying processing is performed, instead of displaying directly the difference value on the 7-segment LED display portion 26 in the display portion 21. When the detection state (the sensor output) is at an OFF state, 0 is displayed, regardless of the amount of displacement and the difference value. If the difference value exceeds the threshold value 37a, the detection state is changed from the OFF state to an ON state and, during the time period which the detection state is at the ON state, the difference value at that time is held and displayed. Further, if the difference value is decreased to below the threshold value 37b, the detection state is changed from the ON state to an OFF state, again, and 0 is displayed regardless of the amount of displacement and the difference value. That is, the difference value output as a measurement value is updated on the basis of the sensor output.

When the work has a plate shape or a box shape, the held difference value indicates the thickness of the work, although it also depends on the shape of the work. Therefore, it is possible to display an appropriate numerical value, in comparison with cases of displaying the current difference value. Further, it is possible to determine easily whether the sensor output is ON or OFF, on the basis of whether the displayed numerical value is 0 or other numerical values. Accordingly, by detecting a work using the difference value between amounts of displacement, it is possible to suppress the influences of swings and swelling of the work bench and the like thereby improving the environment resistance performance, and also it is possible to display appropriate measurement values.

The display processing portion 38 performs processing for displaying the measurement value on the 7-segment LED display portion 26 in the display portion 21, on the basis of the measurement value output from the measurement processing portion 32.

Figure 5:
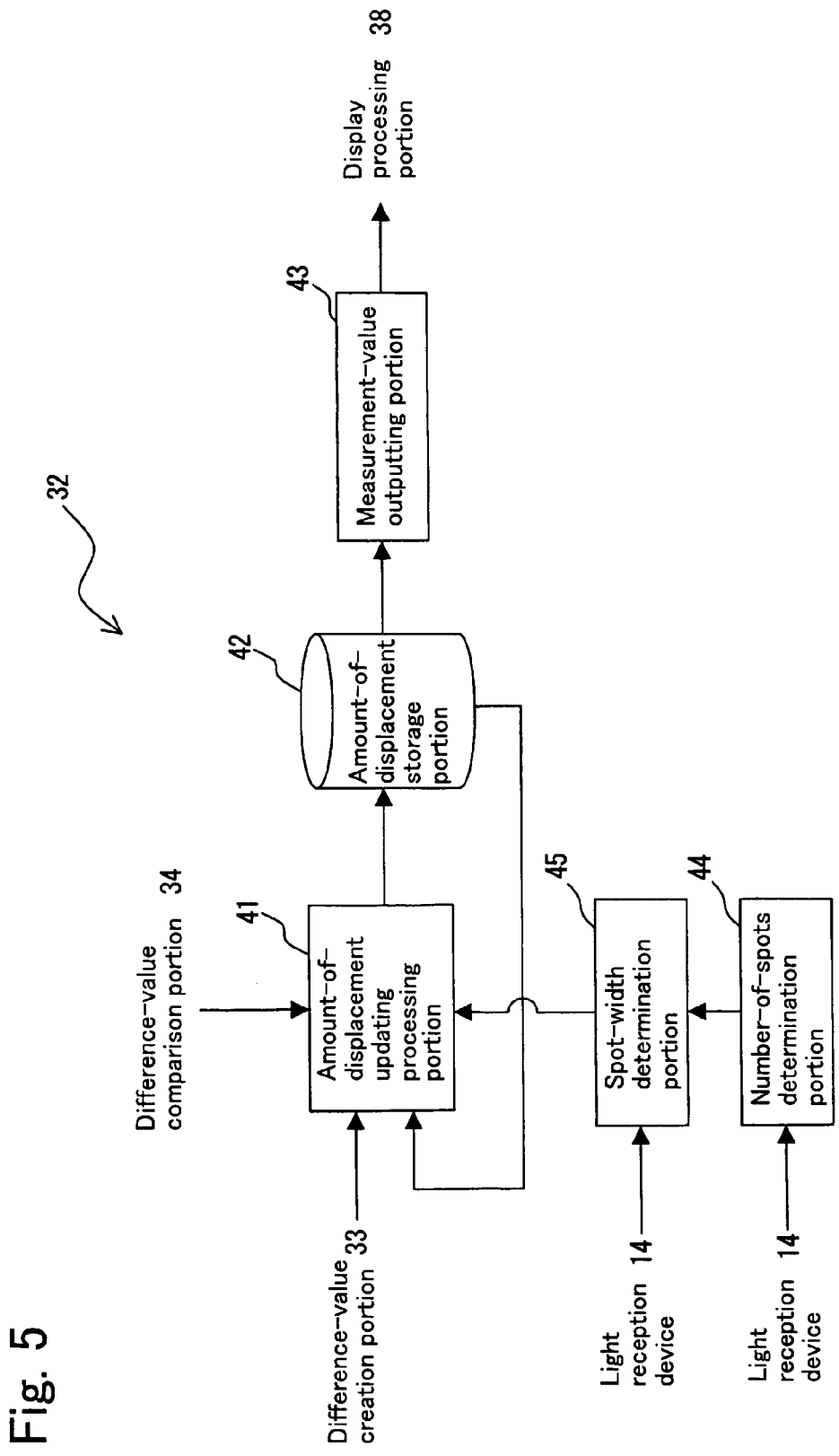
FIG. 5 is a block diagram illustrating an exemplary structure of a measurement processing portion 32 in the main-body unit 4 of FIG. 4.

FIG. 5 is a block diagram illustrating an exemplary structure of the measurement processing portion 32 in the main body unit 4 of FIG. 4. The measurement processing portion 32 is constituted by an amount-of-displacement updating processing portion 41, an amount-of-displacement storage portion 42, a measurement-value outputting portion 43, a number-of-spots determination portion 44 and a spot-width determination portion 45. The number-of-spots determination portion 44 performs processing for determining the number of received-light spots on the light reception device 14, on the basis of the outputs of the respective light reception elements in the light reception device 14.

The spot-width determination portion 45 performs processing for determining the width of the received-light spot, that is, the length of the one-dimensional area extracted as a received-light spot from a one-dimensional distribution of the amount of received light. The width of the received-light spot is determined on the basis of, for example, positions on the light reception device 14 at which the amount of received light is one half the amount of received light at the peak position. In this case, the processing for determining the width of the received-light spot is performed only when the number of received-light spots is one, but the processing for determining the width of the received-light spot is not performed when the number of received-light spots is 0 or 2 or more.

The amount-of-displacement storage portion 42 is a memory for storing the amount of displacement calculated by the amount-of-displacement calculation portion 31 such that it is rewritable. The amount-of displacement updating processing portion 41 performs updating processing for rewriting the content of the amount-of-displacement storage portion 42, if a new amount of displacement is obtained. This updating processing is performed by selecting one of the amount of displacement read from the amount-of-displacement storage portion 42 and the amount of displacement calculated by the amount-of-displacement calculation portion 31, on the basis of the result of comparison made by the difference-value comparison portion 34, and then writing the selected amount of displacement in the amount-of-displacement storage portion 42.

More specifically, when the difference value between amounts of displacement exceeds the positive threshold value 37a in the positive direction and when the difference value between amounts of displacement exceeds the negative threshold value 37b in the negative direction, the amount of displacement calculated by the amount-of-displacement calculation portion 31 is selected, but in other cases the amount of displacement read from the amount-of-displacement storage portion 42 is selected. That is, the amount of displacement in the amount-of-displacement storage portion 42 is replaced, through rewriting, with a new amount of displacement, at the timing when the sensor output is turned on or off, but in other cases the amount of displacement in the amount-of-displacement storage portion 42 is maintained at the current value without being rewritten.

In this case, instead of directly storing the amount of displacement calculated by the amount-of-displacement calculation portion 31 in the amount-of-displacement storage portion 42, the result of calculation of the difference value by the difference-value creation portion 33 is stored as measurement-value data in the amount-of-displacement storage portion 42, and the amount-of-displacement updating processing portion 41 rewrites the difference value in the amount-of-displacement storage portion 42, on the basis of the difference value calculated by the difference-value creation portion 33.

The measurement-value outputting portion 43 performs operations for outputting, as a measurement value, the amount of displacement held in the amount-of-displacement storage portion 42. The display processing portion 38 performs processing for displaying, on the 7-segment LED display portion 26, the amount of displacement held in the amount-of-displacement storage portion 42. With this structure, the content of the amount-of-displacement storage portion 42 is rewritten, on the basis of the result of the comparison between the difference value and the positive threshold value 37$a$ and the negative threshold value 37$b$, and the measurement value of the amount of displacement is updated, which can suppress the variation of measurement values, due to swaying, swelling and fluttering of the work bench A2 on which the work A1 is placed.

In this case, the amount-of-displacement updating processing portion 41 performs the updating processing on the basis of the results of determinations by the number-of-spots determination portion 44 and the spot-width determination portion 45. More specifically, when the number of received-light spots is one, the amount of displacement is rewritten on the basis of the result of determination by the spot-width determination portion 45, but in other cases, when the number of received-light spots is 0 or 2 or more, the amount of displacement is not rewritten. More specifically, even when the number of received-light spots is one, if the width of the received-light spot does not fall within a predetermined range, the amount of displacement is not rewritten. Only when the number of received-light spots is one and, also, the width of the received-liqht spot falls within the predetermined range, the amount of displacement is rewritten.

With this structure, only when it is determined that the number of received-light spots is one and, also, the width of the received-light spot falls within the predetermined range, the measurement value of the amount of displacement is rewritten, which can suppress the variation of the measurement value of the amount of displacement, in cases where the reflected light L2 from the work A1 contains light caused by multiple reflections.

Also, it is not necessary to perform the processing for determining the width of the received-light spot when the number of received-light spots is one. The amount of displacement can be rewritten when the number of received-light spots is one, but in other cases the amount of displacement is not be rewritten.

Figure 6:
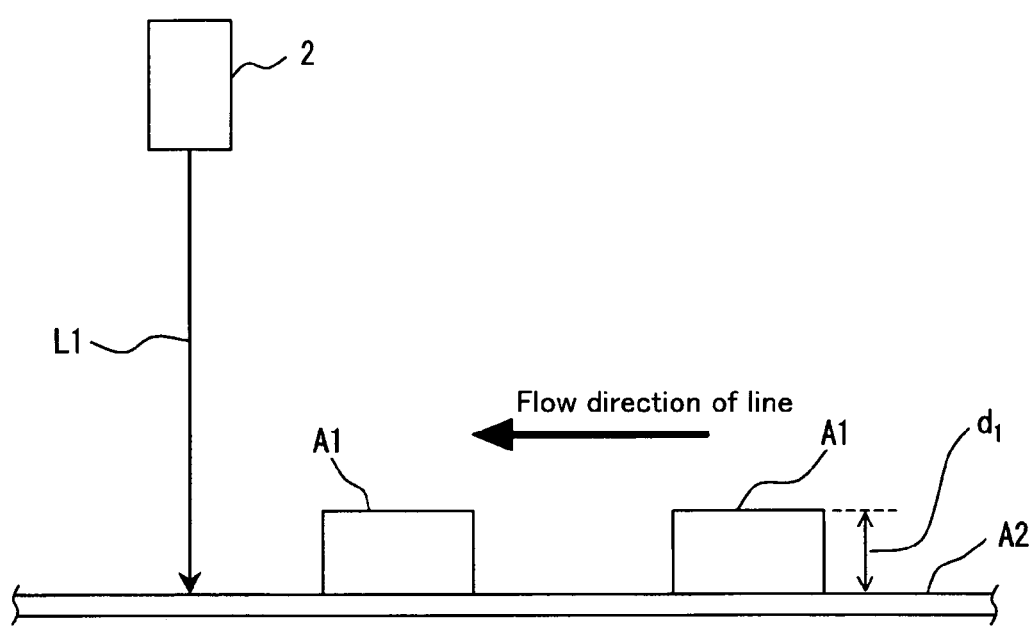
FIG. 6 is a view illustrating an exemplary operation of the optical displacement measurement device 1 of FIG. 1 for detection of works, illustrating the head unit 2 placed in a manufacturing line.

FIG. 6 is a view illustrating an exemplary operation of the optical displacement measurement device 1 of FIG. 1 for detection of works, illustrating the head unit 2 placed in a manufacturing line. A plurality of works A1 are placed on a belt conveyor as a work bench A2 along the line and are transferred in the horizontal direction. The optical displacement measurement device 1 determines whether or not a work A1 exists beneath the head unit 2, on the basis of the reflected light resulted from irradiation of the projected light L1. When a work A1 exists, the position of the received-light spot created by the reflected light is different from the position of the received-light spot of when no work A1 exists. This causes the amount of displacement of the work A1 to be changed by an amount corresponding to the thickness d1 of the work A1. The displacement measurement device 1 determines the presence or absence of a work A1 by utilizing the fact that the amount of displacement is largely changed due to the existence of the work A1.

FIGS. 7A and 7B are views illustrating exemplary operations of the optical displacement measurement device 1 of FIG. 1 for detection of works, illustrating amounts of displacements and difference values sampled at constant time intervals. FIG. 7A illustrates detected values of amounts of displacements obtained at respective samplings, by designating the time axis along the horizontal axis while designating the amounts of displacements along the vertical axis. In this example, sampling is started at a time t1, and the amount of displacement is not changed and the detected value thereof is maintained at a constant value of x1 during the time period from t1 to t3.

Thereafter, the amount of displacement is largely changed in the positive direction, and the detected value thereof is x2 (x2>x1), at a time t4. During the time period from t4 to t6, the amount of displacement is not changed and the detected value thereof is maintained at x2. Thereafter, the amount of displacement is largely changed in the negative direction, and the detection value is x1, at a time t7. During the time period from t7 to t11, the amount of displacement is not changed, and the detection value thereof is maintained at x1. Thereafter, the amount of displacement is largely changed in the positive direction, and the detection value thereof is x2, at a time t12.

FIG. 7B illustrates detected values of difference values obtained at respective samplings, by designating the time axis along the horizontal axis while designating the difference values along the vertical axis. The acquisition of a difference value is started at the time t2, and the difference value is not changed and the detected value thereof is maintained at 0, during the time period from t2 to t3.

Thereafter, the difference value is largely changed in the positive direction, and the detection value is y1 (y1>0), at the time t4. The detection value y1 equals to x2−x1, indicating the thickness d1 of a work A1. Then, at the time t5, the detection value becomes 0 and, during the time period from t5 to t6, the difference value is not changed, and the detection value is maintained at 0.

Thereafter, the difference value is changed in the negative direction, and the detection value thereof is y2 (y2<0), at the time t7. Then, at the time t8, the detected value becomes 0 and, during the time period from t8 to t11, the difference value is not changed, and the detected value thereof is maintained at 0. Then, the difference value is changed in the positive direction, and the detected value thereof becomes y1, at the time t12.

As described above, during the time period from t3 to t4, during the time period from t6 to t7 and during the time period from t11 to t12, the amount of displacement is largely changed due to the existence of the work A1 and, at the times t4, t7 and t12, the absolute value of the difference value has been increased. Accordingly, by setting the positive threshold value u1 and the negative threshold value u2 to appropriate values according to the thickness of the works A1 to be detected, it is possible to determine the presence or absence of a work A1 correctly. In this example, at the time 4, the detected difference value y1 exceeds the threshold value u1 in the positive direction, and the sensor output is on. Thereafter, at the time t7, the detected difference value y2 exceeds the threshold value u2 in the negative direction, and the sensor output is off. Further, at the time t12, the detected difference value y1 exceeds the threshold value u1 in the positive direction, and the sensor output is on.

Figure 8:
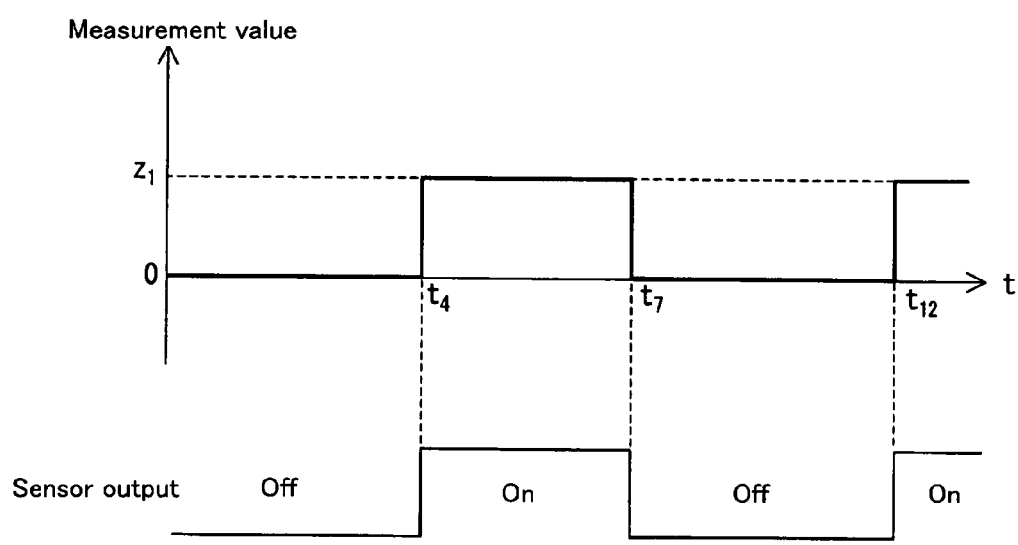
FIG. 8 is a timing chart illustrating exemplary operations of the optical displacement measurement device 1 of FIG. 1 for detection of works, illustrating measurement values of amount of displacements and sensor outputs.

FIG. 8 is a timing chart illustrating exemplary operations of the optical displacement measurement device 1 of FIG. 1 for detection of works, illustrating measurement values of amounts of displacements and sensor outputs indicating the presence or absence of a work A1. The measurement value of the amount of displacement is updated on the basis of the results of comparisons between the difference value and the positive threshold value u1 and the negative threshold value u2. That is, the output of the measurement value is updated only when the difference value exceeds the positive threshold value u1 in the positive direction and when the difference value exceeds the negative threshold value u2 in the negative direction, and in other cases the output of the measurement value is maintained at the current value.

In this example, the measurement values are illustrated, assuming that the detected value of the amount of displacement obtained when no work A1 exists is 0. Until the time t4, the measurement value is maintained at 0. Then, at the time t4, the measurement value is updated to z1 (z1>0) and, during the time period from the time t4 to the time t7, the measurement value is maintained at z1. Further, at the time t7, the measurement value is updated to 0 and, during the time period from the time t7 to the time t12, the measurement value is maintained at 0. Then, at the time t12, the measurement value is updated to z1.

As described above, the measurement value of the amount of displacement is updated on the basis of the results of comparisons between the difference value and the positive threshold value u1 and the negative threshold value u2, which can prevent the measurement value from being updated due to the influences of swaying, swelling or fluttering of the work bench A2.

Figures 9A, 9B:
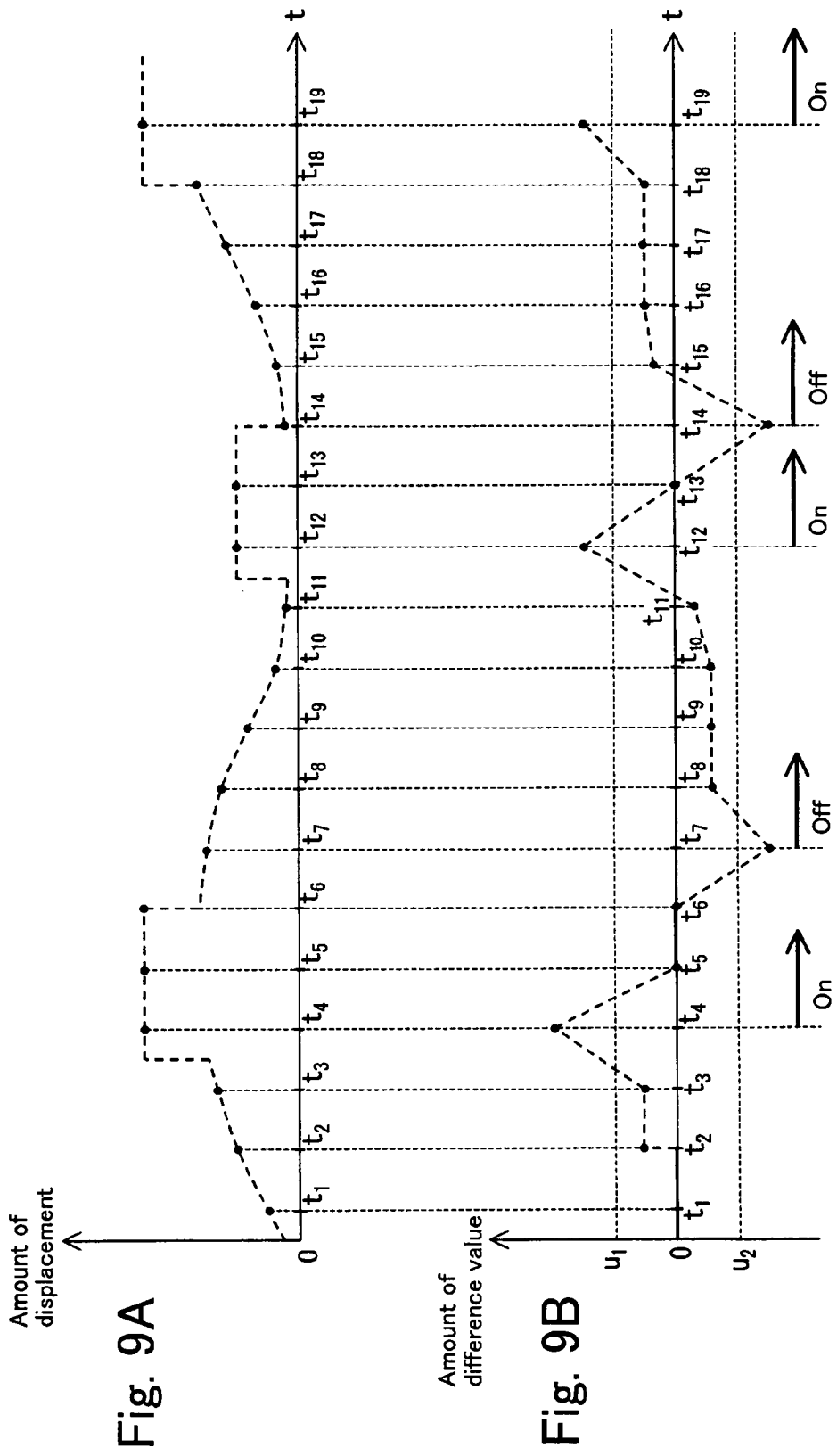
FIGS. 9A and B are views illustrating exemplary operations of the optical displacement measurement device 1 of FIG. 1 for detection of works, illustrating amount of displacements and difference values, in a case where the position of a work A1 is changed.

FIGS. 9(a) and (b) are views illustrating another exemplary operations of the optical displacement measurement device 1 of FIG. 1 for detection of works, illustrating amounts of displacements and difference values in the case where the position of a work A1 is changed in the direction of the optical axis of the projected light L1 due to swaying of the work bench A2. FIG. 9(a) illustrates detected values of amounts of displacements obtained at respective samplings, by designating the time axis along the horizontal axis while designating the amounts of displacements along the vertical axis.

In this example, sampling is started at a time t1 and, during the time period from t1 to t3, the amount of displacement is monotonically increased. Thereafter, at a time t4, the amount of displacement is largely changed in the positive direction and, during the time period from t4 to t6, the amount of displacement is kept constant. Thereafter, at time t7, the amount of displacement is largely changed in the negative direction and, during the time period from t7 to t11, the amount of displacement is monotonically decreased. Further, at a time t12, the amount of displacement is largely changed in the positive direction and, during the time period from t12 to t13, the amount of displacement is kept constant. Thereafter, at a time t14, the amount of displacement is largely changed in the negative direction and, during the time period from t14 to t18, the amount of displacement is monotonically increased. Then, at a time t19, the amount of displacement is largely changed in the positive direction.

FIG. 9B illustrates detected values of difference values obtained at the respective samplings, by designating the time axis along the horizontal axis while designating the difference values along the vertical axis. The acquisition of a difference value is started at the time t2, and the difference value is not changed during the time period from t2 to t3. Thereafter, at the time t4, the difference value is changed in the positive direction and exceeds the positive threshold value u1. During the time period from t5 to t6, the difference value is not changed, and the detection value thereof is maintained at 0. Thereafter, at the time t7, the difference value is changed in the negative direction to below the negative threshold value u2.

During the time period from t8 to t11, the difference value is hardly changed and, thereafter, at the time t12, the difference value is changed in the positive direction to above the positive threshold value u1. Thereafter, at the time t14, the difference value is changed in the negative direction to below the negative threshold value u2. During the time period from t15 to t18, the difference value is hardly changed and, thereafter, at the time t19, the difference value is changed in the positive direction to above the positive threshold value u1.

As described above, even if the position of the work A1 is changed due to swaying of the work bench A2, the amount of displacement is largely changed due to the existence of the work A1 during the time period from t3 to t4, during the time period from t6 to t7, during the time period from t11 to t12, during the time period from t13 to t14 and during the time period from t18 to t19, and the absolute value of the difference value has been increased at the times t4, t7, t12, t14 and t19.

In general, even if the position of the work A1 is changed in the direction of the optical axis of the projected light L1, when the period of the change of the position is greater than the time intervals of sampling of the amount of displacement, it is expected that the difference value between amounts of displacement is largely changed due to the existence of the work A1. Accordingly, even in such a case, it is possible to determine, correctly, the presence or absence of the work A1. In this example, at the time t4, the detected value of the difference value exceeds the threshold value u1 in the positive direction, and the sensor output is on. Thereafter, at the time t7, the detected value of the difference value exceeds the threshold value u2 in the negative direction, and the sensor output is off. Thereafter, at the time t12, the detected value of the difference value exceeds the threshold value u1 in the positive direction, and the sensor output is on. Thereafter, at the time t14, the detected value of the difference value exceeds the threshold value u2 in the negative direction, and the sensor output is off. Thereafter, at the time t19, the detected value of the difference value exceeds the threshold value u1 in the positive direction, and the sensor output is on.

In this case, when the sensor output is off, zero is displayed as the difference value which is outputted as the measurement value of the amount of displacement. When the sensor output is on, the difference value obtained at the timing of the transition of the sensor output from OFF to ON is held.

Further, when the velocity of swaying of the belt conveyer is larger and the period of the change of the position of the work A1 is smaller, by setting the intervals of sampling to be smaller than the period of the change, it is possible to suppress the change of the difference value caused by swaying, thereby enabling the accurate detection of the presence or absence of the work A1. Further, when the thickness of the work A1 is moderately varied at its end portions, it is possible to increase the intervals of sampling, it is possible to cause the difference value to be largely changed at the end portions of the work, which enables correctly detecting the presence or absence of the work A1.

Further, even when the directed value of the amount of displacement is moderately changed due to the change of the temperature around the head unit 2, by setting the intervals of sampling to be smaller than the period of the change, it is possible to detect correctly the presence or absence of the work A1 without being influenced by the temperature change.

Figure 10:
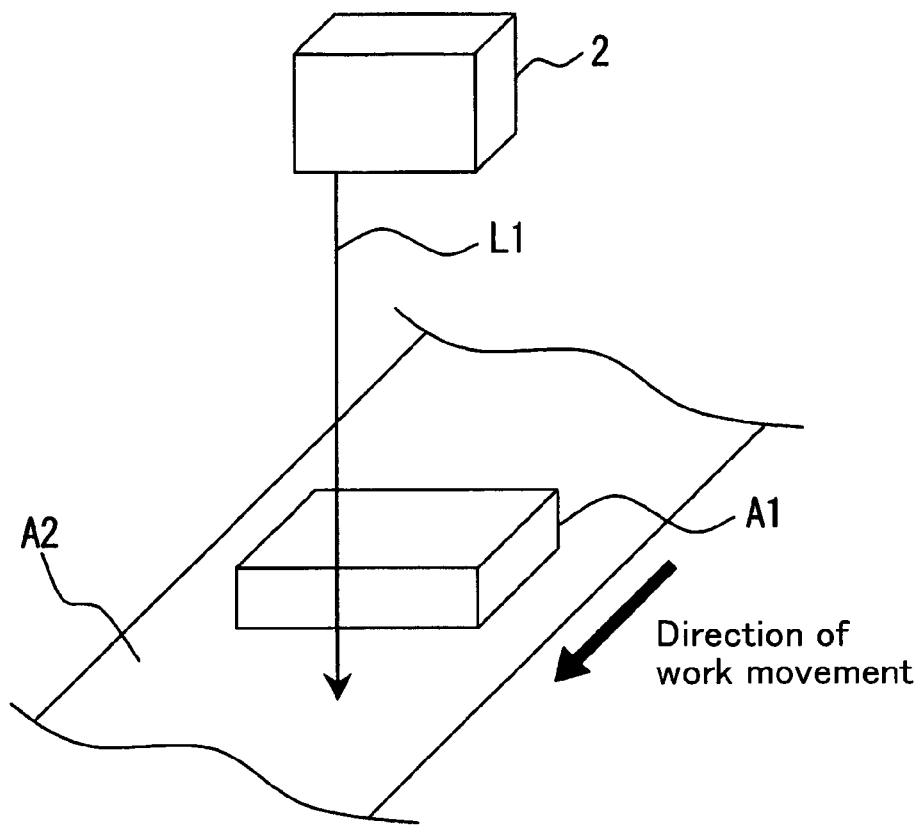
FIG. 10 is a perspective view illustrating exemplary operations of the optical displacement measurement device 1 of FIG. 1, illustrating a state where the amount of displacement of a work A1 moving in the direction of the line is continuously determined.

FIG. 10 is a perspective view illustrating an exemplary operation of the optical displacement measurement device 1 of FIG. 1, illustrating a state where the amount of displacement of a work A1 moving in the direction of the line is continuously measured. In cases where the amount of displacement of the work A1 slowly moving on the work bench A2 is repeatedly detected at time intervals smaller than the speed of movement of the work A1, the end portions of the work A1 are repeatedly detected. While the projected light L1 is scanned over an end portion of the work, the distribution of the amount of received light is distorted due to the influence of multiple reflections and, also, the distribution of the amount of received light is largely changed at every detection, thereby reducing the accuracy of the detection of the amount of displacement.

Figure 11A:
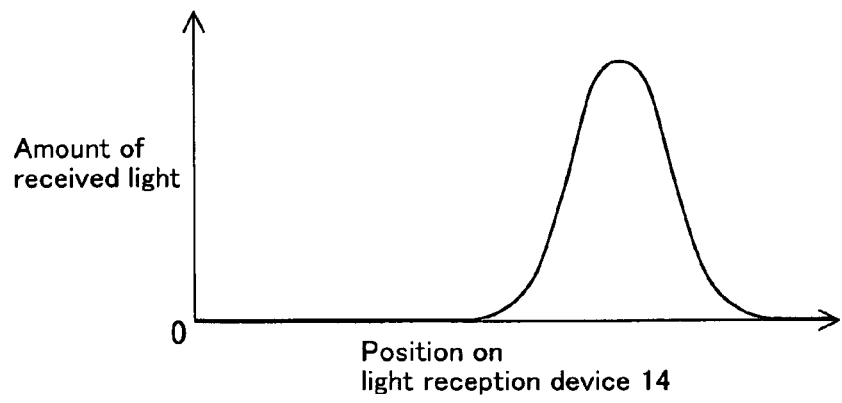
FIG. 11A-C are transition diagrams illustrating exemplary operations of the optical displacement measurement device 1 of FIG. 1, illustrating distributions of amounts of received light obtained by a work A1 moving in the direction of the line.
Figure 11B:
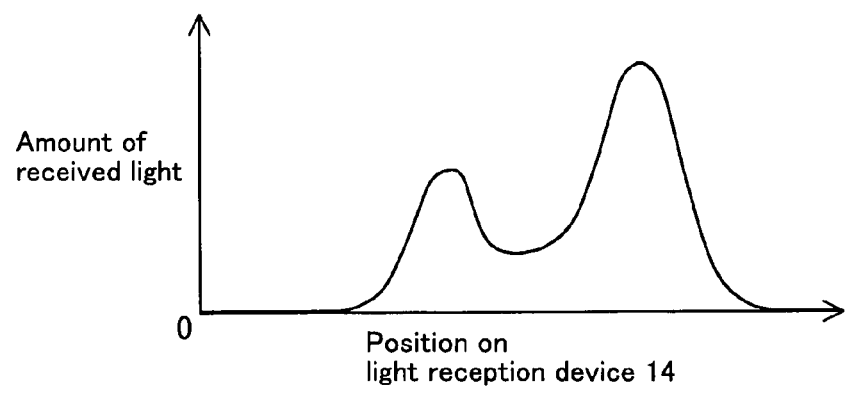
Figure 11C:
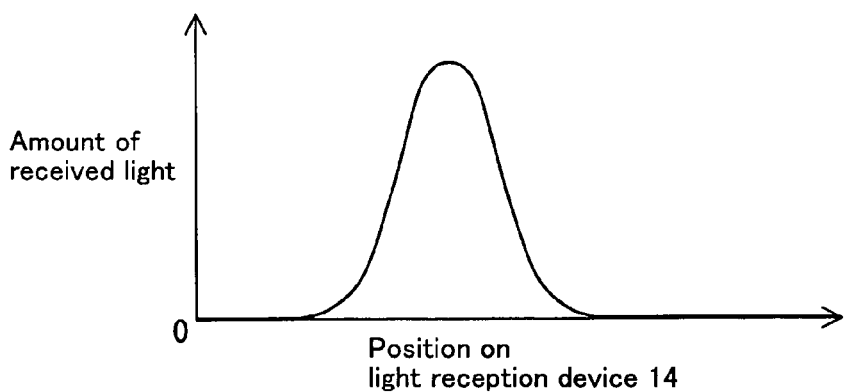

FIGS. 11A to 11C are transition diagrams illustrating exemplary operations of the optical displacement measurement device 1 of FIG. 1, illustrating distributions of the amount of received light which are resulted from irradiation of the projected light L1 to the work A1 moving in the direction of the line. FIG. 11A illustrates a distribution of the amount of received light which is caused by light reflected by portions before the work A1. FIG. 11B illustrates a distribution of the amount of received light which is caused by light reflected by an end portion of the work A1. FIG. 11C illustrates a distribution of the amount of received light which is caused by light reflected by portions of the work A1 other than the end portions thereof.

When the head unit 2 exists before work A1, light reflected by the work bench A2 is received, and a single received-light spot is detected. When an end portion of the work A1 is moved to beneath the head unit 2, the distribution of the amount of received light is distorted due to the influence of multiple reflections at the end portion of the work, and a plurality of received-light spots are detected. In the present embodiment, during the occurrence of such multiple reflections, the processing for updating the measurement value of the amount of displacement is performed, and the current measurement value is maintained.

Figure 12:
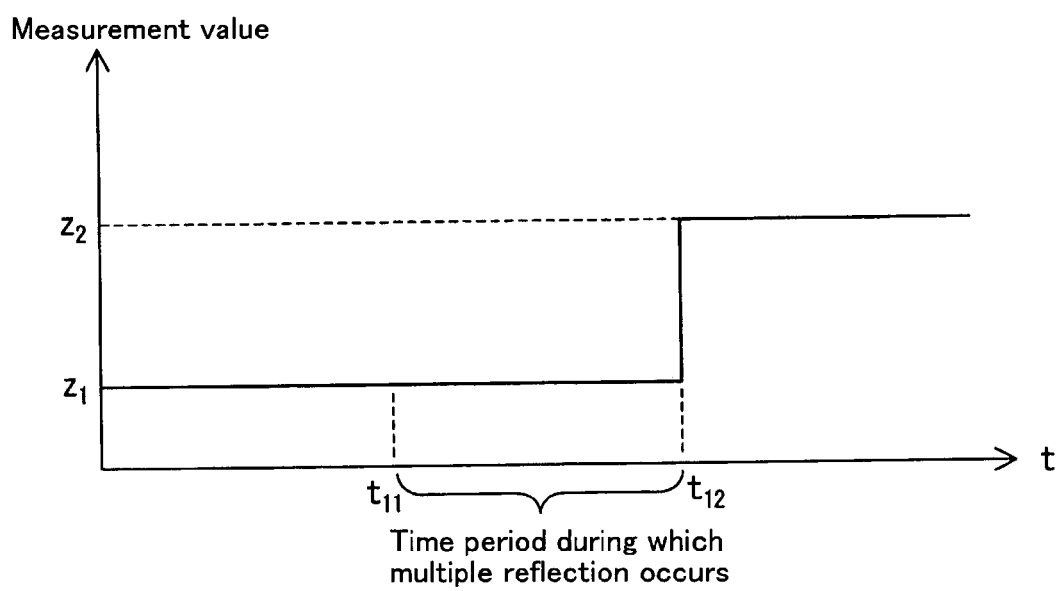
FIG. 12 is a timing chart illustrating exemplary operations of the optical displacement measurement device 1 of FIG. 1, illustrating measurement values obtained by a work A1 moving in the direction of the line.

FIG. 12 is a timing chart illustrating an exemplary operation of the optical displacement measurement device 1 of FIG. 1, illustrating measurement values resulted from continuous measurements of amounts of displacements of the work A1 moving in the direction of the line. During the time period during which multiple reflections occur (the time period from t11 to t12), a measurement value of z1 resulted from measurement when the head unit 2 exists before the work A1 is maintained and output as a measurement-value output. When the multiple-reflection state has been overcome due to the movement of the work A1, the measurement value of the amount of displacement is updated. In this example, it is updated to a measurement value of z2, at the time t12.

As described above, only when it is determined that the number of received-light spots on the light reception device 14 is one, the measurement value of the amount of displacement is updated. Accordingly, in cases where the reflected light L2 from the work A1 contains light caused by multiple reflections, it is possible to prevent the measurement value of the amount of displacement from being varied.

Figure 13:
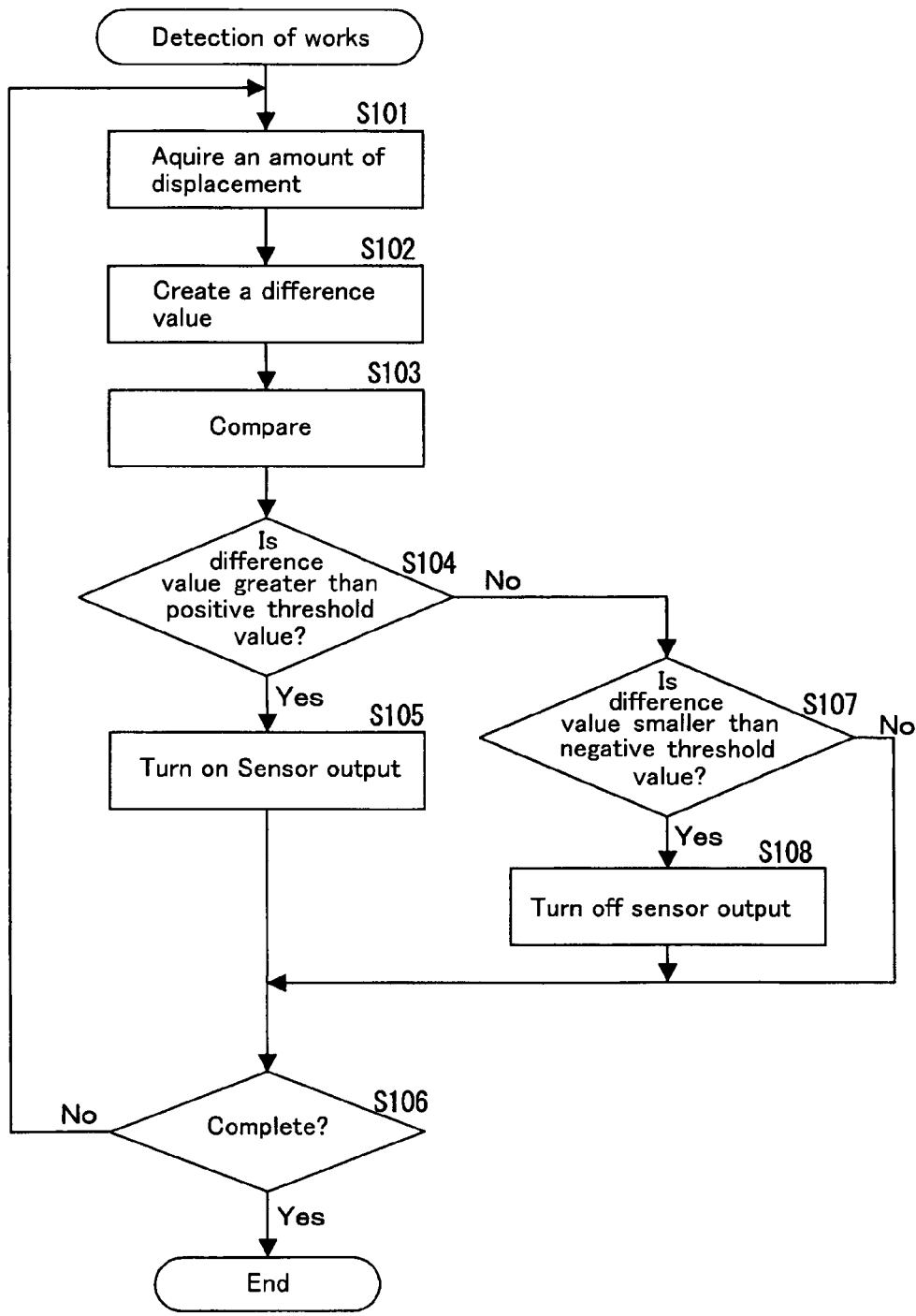
FIG. 13 is a flow chart illustrating exemplary operations of the optical displacement measurement device 1 of FIG. 1 for detection of works.

FIG. 13 is a flow chart illustrating exemplary operations of the optical displacement measurement device 1 of FIG. 1 in steps S101 to S108 for detection of works. At first, the difference-value creation portion 33, on acquiring an amount of displacement from the amount-of-displacement calculation portion 31, creates a difference value from two amounts of displacement which have been continuously acquired (steps S101 and S102). Next, the difference-value comparison portion 34 makes a comparison between the difference value determined by the difference-value creation portion 33 and the positive threshold value 37a and the negative threshold value 37b and then outputs the result of comparison to the object detection processing portion 35 (step S103).

The object detection processing portion 35 switches the sensor output on the basis of the result of the comparisons between the difference value and the positive threshold value 37a and the negative threshold value 37b. At this time, if the difference value is greater than the positive threshold value 37a, the sensor output is turned on (steps S104 and S105). On the other hand, if the difference value is smaller than the negative threshold value 37b, the sensor output is turned off (steps S104, S107 and S108).

On the other hand, if the difference value falls between the negative threshold value 37b and the positive threshold value 37a, the sensor output is maintained without being switched. The processing procedures from step S101 to step S105, step S107, and step S108 are repeated at predetermined time intervals until the completion of the detection of works (step S106).

Figure 14A:
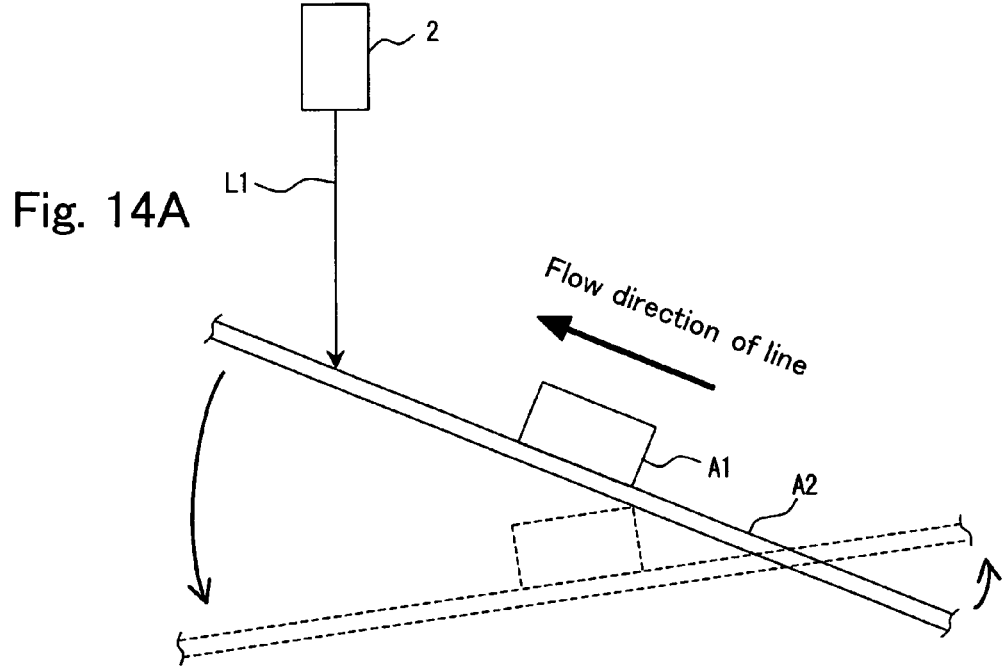
FIGS. 14A and B are views illustrating an exemplary operation of the optical displacement measurement device 1 of FIG. 1 for detection of a work, illustrating a case where the work bench A2 on which the work A1 is placed is largely swayed.
Figure 14B:
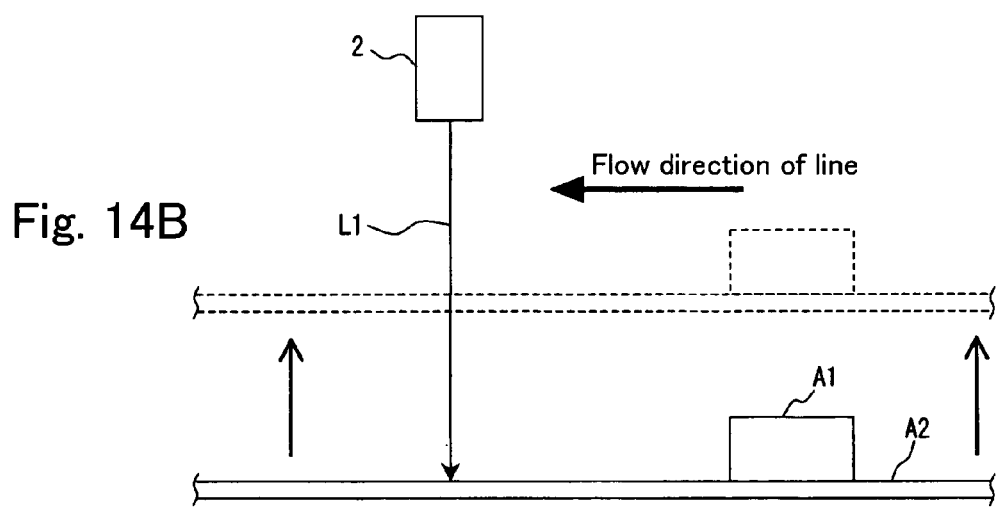

FIGS. 14A and 14B are views illustrating exemplary operations of the optical displacement measurement device 1 of FIG. 1 for detection of works, illustrating a case where the work bench A2 on which the work A1 is placed is largely swayed. FIG. 14A illustrates a case where the work bench A2 is swayed in the direction of pitching. In this example, the front side and the rear side of the work bench A2 are moved in the opposite directions with respect to the direction of the liner in other words, the direction of transfer of the work A1. The work A1 is largely moved in the direction of the optical axis of the projected light L1, due to such swaying of the work bench A2.

FIG. 14B illustrates a case where the work bench A2 is swayed in the vertical direction. In this example, the front side and the rear side of the work bench A2 are moved in the same direction with respect to the direction of the line, in other words, the direction of transfer of the work A1. The work A1 is largely moved in the direction of the optical axis of the projected light L1, due to such swaying of the work bench A2. Even in such a case, by setting the time intervals of sampling of amounts of displacements to be smaller than the period of the change of the position of the work bench A2, it is possible to detect the work A1 correctly.

Figure 15A:
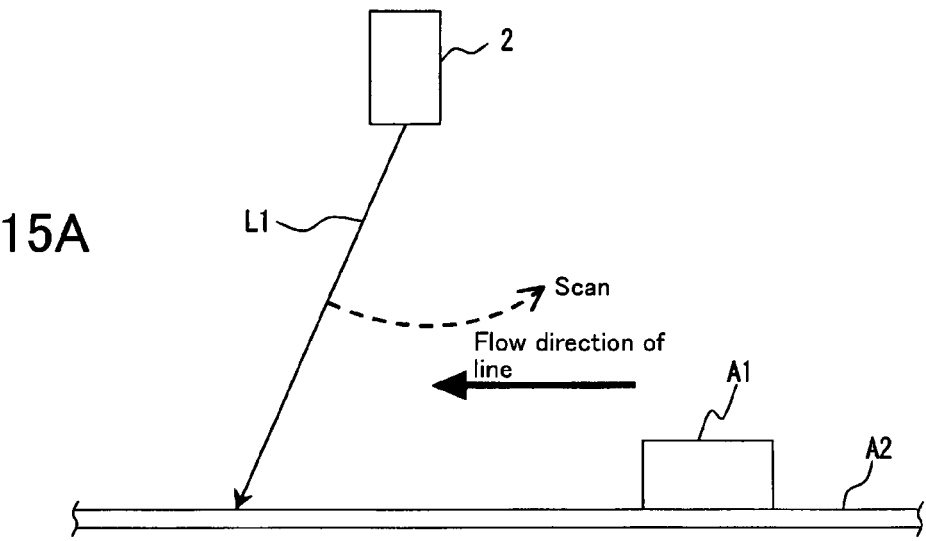
FIGS. 15A and B are views illustrating an exemplary operation of the optical displacement measurement device 1 of FIG. 1 for detection of a work, illustrating a case where the projected light L1 is scanned in a one-dimensional direction for detecting the work A1.
Figure 15B:
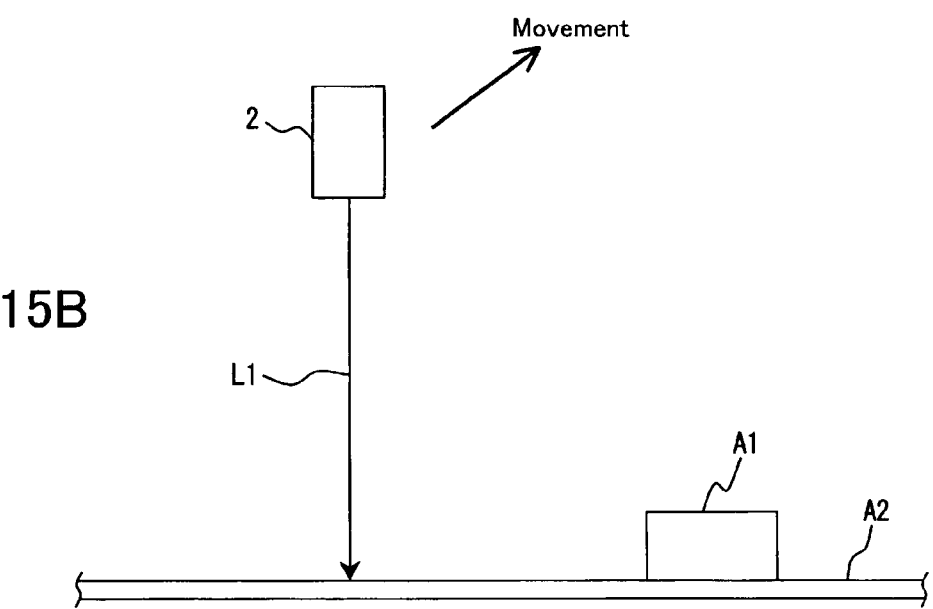

FIGS. 15A and 15B are views illustrating exemplary operations of the optical displacement measurement device 1 for detection of works, illustrating a case where the projected light L1 is scanned in a one-dimensional direction for detecting the work A1. FIG. 15A illustrates a case where the projected light L1 is scanned over the work bench A2 while the direction of irradiation thereof is changed, and FIG. 15(b) illustrates a case where the projected light L1 is scanned while the head unit 2 is moved in a direction different from a horizontal direction.

Even in such a case, by setting the time intervals of sampling of amounts of displacements to be smaller than the period of the change of the amount of displacement due to the scanning of the projected light L1, it is possible to detect the work A1 correctly.

According to the present embodiment, the determination of the presence or absence of works A1 is performed on the basis of difference values between amounts of displacement, which enables correct detection of works A1 and can improve the detection accuracy in detecting the presence or absence of works A1, even if the positions of the works A1 are changed more largely than the thicknesses of the works A1 in the direction of the optical axis of the projected light L1. Further, the content of the amount-of-displacement storage portion 42 is rewritten on the basis of the results of comparisons between the difference value and the positive threshold value 37a and the negative threshold value 37b, and the measurement value of the amount of displacement is updated, which can suppress the variation of the detection value due to swaying, swelling and fluttering of the work bench A2.

In the present embodiment, there has been described a case where amounts of displacements of a work A1 are sampled at constant time intervals, and the detection of the presence or absence of the work A1 is performed on the basis of difference values resulted from the sampling, the present invention is not limited thereto. For example, it is possible to employ a differentiating circuit for differentiating the output of the light reception device 14 in an analog or digital manner for determining values resulted from differentiation of the amount of displacement, and the detection of the presence or absence of the work A1 can be performed on the basis of these values resulted from differentiation.

Further, in the present embodiment, there has been described a case where the processing for calculating the amount of displacement is performed with respect to a received-light spot at which the amount of received light is maximum in cases where a plurality of received-light spots are extracted, the present invention is not limited thereto. For example, when the number of received-light spots is one, the amount-of-displacement calculation portion 31 performs processing for determining the one-dimensional position of this received-light spot and calculating the amount of displacement, but in other cases it does not performs the processing for calculating the amount of displacement. Further, the difference-value creation portion 33 can be structured not to determine a difference value until the next sampling if a new amount of displacement was not obtained at sampling, but, if a new amount of displacement is obtained, determine the difference value between this new amount of displacement and the amount of displacement obtained at the previous sampling.

In general, if the projected light L1 is irregularly reflected by an end portion of the work A1, it is expected that a distortion is induced in the distribution of the amount of light on the light reception device 14. In such a case, the position of the received-light spot can not be determined correctly or the position of the received-light spot is wrongly determined in many cases even if it is determined. With the aforementioned structure, the processing for calculating the amount of displacement is performed on the basis of the result of the determination of the number of received-light spots and, only when a new amount of displacement is obtained, the determination of the presence or absence of the work A1 is performed. Accordingly, the determination of the presence or absence based on difference values is not performed in the aforementioned case and is performed only when no distortion occurs in the distribution of the amount of light, which can improve the accuracy of detection of the work A1.

What is claimed is:

1. An optical displacement sensor comprising:
   a light projection device for directing projected light to a target object;
   a light reception device for receiving light reflected by said target object from the projected light;
   an amount-of-displacement calculation means for determining a one-dimensional position of a received-light spot on the light reception device, on the basis of the output of said light reception device, and calculating a amount of displacement of said target object, on the basis of the one-dimensional position of the received-light spot determined;
   a difference-value creation means for sampling the amount of displacement calculated by said amount-of-displacement calculation means by a constant time interval, and determining a value of a difference between a current value representing the amount of displacement sampled at a current timing and a previous value representing the amount of displacement sampled at a previous timing prior to the current timing as a difference value;
   a difference-value comparison means for making a comparison of the difference value determined by said difference-value creation means with two threshold values including a positive threshold value and a negative threshold value; and
   an object detection means for determining the presence or absence of said target object on the basis of the result of the comparison made by said difference-value comparison means, and outputting a detection signal indicative of the result of the determination of the presence or absence of said target object;
   wherein said object detection means turns on the detection signal on the basis of the result of the comparison of the difference value with one of the two threshold values, and turns off the detection signal on the basis of the result of the comparison of the difference value with the other of the two threshold values.

2. The optical displacement sensor according to claim 1, wherein said object detection means turns on the detection signal when the difference value exceeds the threshold value of the positive value in the positive direction and turns off the detection signal when the difference value exceeds the threshold value of the negative value in the negative direction.

3. The optical displacement sensor according to claim 1, further comprising:
   an amount-of-displacement storage means for storing the amount of displacement calculated by said amount-of-displacement calculation means,
   an amount-of-displacement display means for displaying the amount of displacement stored in said amount-of-displacement storage means, and
   an amount-of-displacement updating means for, when a new amount of displacement is sampled, selecting one from a group of the amount of displacement read from said amount-of-displacement storage means and the amount of displacement calculated by said amount-of-displacement calculation means, on the basis of the result of the comparison made by said difference-value comparison means, and controlling the content of said amount-of-displacement storage means to the selected amount of displacement.

4. The optical displacement sensor according to claim 3, further comprising: a number-of-spots determination means for determining a number of received-light spot on the light reception device, on the basis of the output of said light reception device,
   wherein said amount-of-displacement updating means maintains the content of the amount-of-displacement storage means when the number of received-light spots is not one regardless the result of the comparison made by said difference-value comparison means.

5. The optical displacement sensor according to claim 4, further comprising: a spot-width determination means for determining a width of said received-light spot, on the basis of the output of said light reception device, wherein said amount-of-displacement updating means maintains the content of the amount-of-displacement storage means when the width of said received-light spot does not fall within a predetermined range regardless the result of the comparison made by said difference-value comparison means.

6. The optical displacement sensor according to claim 1, further comprising: a number-of-spots determination means for determining a number of received-light spot on the light reception device, on the basis of the output of the light reception device,
wherein said amount-of-displacement calculation means performs processing for determining the one-dimensional position of the received-light spot and calculating the amount of displacement when the number of received-light spots is one, but does not perform the processing for calculating the amount of displacement when the number of received-light spots is not one, and
said difference-value creation means does not perform the processing for determining the difference value when the amount of displacement is not calculated by said amount-of-displacement calculation means, but, when the amount of displacement is calculated by said amount-of-displacement calculation means and a new amount of displacement is sampled, said difference-value creation means determines the value of difference between this new amount of displacement and the amount of displacement sampled by the previous timing.

7. An optical displacement sensor comprising:
a light projection device for directing projected light to a target object;
a light reception device for receiving light reflected by said target object from the projected light;
a calculator for determining a one-dimensional position of a received-light spot on the light reception device, on the basis of the output of said light reception device, and calculating an amount of displacement of said target object, on the basis of the one-dimensional position of the received-light spot determined;
a difference-value generator for sampling the amount of displacement calculated by the calculator by a constant time interval, and determining a value of a difference between a current value representing the amount of displacement sampled at a current timing and a previous value representing the amount of displacement sampled at a previous timing prior to the current timing as a difference value;
a comparator for making a comparison of the difference value determined by the difference-value generator with two threshold values including a positive threshold value and a negative threshold value; and
a detector for determining the presence or absence of said target object on the basis of the result of the comparison made by the comparator, and outputting a detection signal indicative of the result of the determination of the presence or absence of said target object;
wherein the detector turns on the detection signal on the basis of the result of the comparison of the difference value with one of the two threshold values, and turns off the detection signal on the basis of the result of the comparison of the difference value with the other of the two threshold values.

8. An optical displacement sensor comprising:
a light projection device for directing projected light to a target object;
a light reception device for receiving light reflected by said target object from the projected light;
a device for determining a one-dimensional position of a received-light spot on the light reception device, on the basis of the output of said light reception device; calculating an amount of displacement of said target object, on the basis of the one-dimensional position of the received-light spot determined; sampling the calculated amount of displacement by a constant time interval; determining a value of a difference between a current value representing the amount of displacement sampled at a current timing and a previous value representing the amount of displacement sampled at a previous timing prior to the current timing as a difference value; making a comparison of the determined difference value with two threshold values including a positive threshold value and a negative threshold value; determining the presence or absence of said target object on the basis of the result of the made comparison; and outputting a detection signal indicative of the result of the determination of the presence or absence of said target object;
wherein said device turns on the detection signal on the basis of the result of the comparison of the difference value with one of the two threshold values, and turns off the detection signal on the basis of the result of the comparison of the difference value with the other of the two threshold values.

* * * * *